US011349765B2

(12) United States Patent
Yang et al.

(10) Patent No.: US 11,349,765 B2
(45) Date of Patent: May 31, 2022

(54) POLICY CONTROL METHOD FOR MULTIPATH TRANSMISSION, AND RELATED DEVICE

(71) Applicant: Huawei Technologies Co., Ltd., Shenzhen (CN)

(72) Inventors: Jiao Yang, Xi'an (CN); Hui Ni, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 102 days.

(21) Appl. No.: 16/277,325

(22) Filed: Feb. 15, 2019

(65) Prior Publication Data

US 2019/0182165 A1 Jun. 13, 2019

Related U.S. Application Data

(63) Continuation of application No. PCT/CN2016/095698, filed on Aug. 17, 2016.

(51) Int. Cl.
*H04W 28/10* (2009.01)
*H04L 47/20* (2022.01)
(Continued)

(52) U.S. Cl.
CPC .............. *H04L 47/20* (2013.01); *H04L 45/24* (2013.01); *H04L 47/14* (2013.01); *H04L 47/762* (2013.01);
(Continued)

(58) Field of Classification Search
CPC ....... H04L 47/20; H04L 47/14; H04L 47/762; H04L 45/24; H04L 47/11; H04W 28/02;
(Continued)

(56) References Cited

U.S. PATENT DOCUMENTS 9,295,089 B2 * 3/2016 Chitrapu ............... H04W 36/08
2012/0147839 A1 * 6/2012 Yin ....................... H04W 76/15
370/329
(Continued)

FOREIGN PATENT DOCUMENTS

CN 101662415 A 3/2010
CN 101719918 A 6/2010
(Continued)

*Primary Examiner* — Edan Orgad
*Assistant Examiner* — Malick A Sohrab
(74) *Attorney, Agent, or Firm* — Slater Matsil, LLP

(57) ABSTRACT

Embodiments of the present disclosure disclose a policy control method for multipath transmission, and a related device. User equipment (UE) supporting multipath transmission performs service packet transmission using at least two transmission subflows. The method includes: receiving, by a policy decision network element, association information of the at least two transmission subflows from a communication peer, where the association information includes flow identifiers of the at least two transmission subflows; determining, by the policy decision network element, a resource modification policy of at least one transmission subflow in the at least two transmission subflows based on the association information; and sending, by the policy decision network element, the resource modification policy to a forwarding plane network element corresponding to the at least one transmission subflow.

19 Claims, 15 Drawing Sheets

(51) Int. Cl.
*H04L 45/24* (2022.01)
*H04W 28/02* (2009.01)
*H04W 80/06* (2009.01)
*H04W 4/70* (2018.01)
*H04L 47/762* (2022.01)
*H04L 47/11* (2022.01)

(52) U.S. Cl.
CPC ............. *H04W 4/70* (2018.02); *H04W 28/02* (2013.01); *H04W 28/0273* (2013.01); *H04W 28/10* (2013.01); *H04W 80/06* (2013.01); *H04L 47/11* (2013.01)

(58) Field of Classification Search
CPC ... H04W 80/06; H04W 4/70; H04W 28/0273; H04W 28/10
See application file for complete search history.

(56) References Cited

U.S. PATENT DOCUMENTS

| | | | | |
|---|---|---|---|---|
| 2013/0182573 | A1* | 7/2013 | Soppera | H04L 69/163 370/235 |
| 2014/0078899 | A1* | 3/2014 | Zhou | H04W 76/12 370/230 |
| 2014/0161055 | A1* | 6/2014 | Chitrapu | H04W 36/28 370/329 |
| 2016/0100332 | A1 | 4/2016 | Yi et al. | |
| 2016/0112239 | A1* | 4/2016 | Kanugovi | H04W 88/16 370/338 |
| 2016/0183324 | A1* | 6/2016 | Chitrapu | H04W 72/12 370/338 |
| 2016/0219588 | A1* | 7/2016 | Buddhikot | H04L 41/0896 |
| 2017/0078921 | A1 | 3/2017 | Kia et al. | |
| 2018/0254979 | A1* | 9/2018 | Scahill | H04L 47/193 |

FOREIGN PATENT DOCUMENTS

| | | | | |
|---|---|---|---|---|
| CN | 103763217 | A | 4/2014 | |
| CN | 103916253 | A | 7/2014 | |
| CN | 104753804 | A | 7/2015 | |
| WO | 2015127294 | A1 | 8/2015 | |
| WO | 2015180097 | A1 | 12/2015 | |
| WO | 2016027130 | A1 | 2/2016 | |
| WO | WO-2016027130 | A1 * | 2/2016 | ............ H04L 47/41 |

\* cited by examiner

POLICY CONTROL METHOD FOR MULTIPATH TRANSMISSION, AND RELATED DEVICE

CROSS-REFERENCE TO RELATED APPLICATIONS

This application is a continuation of International Application No. PCT/CN2016/095698, filed on Aug. 17, 2016, the disclosure of which is hereby incorporated by reference in its entirety.

TECHNICAL FIELD

The present disclosure relates to the field of communications technologies, and in particular, to a policy control method for multipath transmission, and a related device.

BACKGROUND

An evolved packet system (EPS) is a concept introduced by the 3rd Generation Partnership Project (3GPP) standard into the 4th generation mobile communication, and includes user equipment (UE), a radio access network, and an evolved packet core (EPC). The EPC includes components such as a mobility management entity (MME), a serving gateway (S-GW), a packet data network gateway (P-GW), and a policy and charging rules function (PCRF). In the EPS, operations such as dedicated bearer activation and bearer quality of service (QoS) modification may be implemented using the UE, a base station, the MME, the S-GW, the P-GW, and the PCRF.

Currently, with rapid development of the Internet and advancement of a broadband access technology of UE such as a mobile phone and a notebook computer, one user equipment has a plurality of network interfaces, for example, a Wireless Fidelity (Wi-Fi) interface, a 2nd generation mobile telecommunications technology (2G) interface, and a 3rd generation mobile telecommunications technology (3G) interface, so that a plurality of links to a target node can be implemented. The conventional Transmission Control Protocol (TCP) is a one-to-one transmission protocol, and cannot fully take advantage of a plurality of addresses and a plurality of network interfaces of the user equipment. Consequently, resource waste is caused. On a basis of this, the Internet Engineering Task Force (IETF) proposes Multipath Transmission Control Protocol (MultiPath TCP, MPTCP). The MPTCP is an improvement protocol of the TCP, and allows two communication parties to perform data transmission using a plurality of connections. In mobile communication, when a UE and a server that support an MPTCP technology communicate with each other using a plurality of connections (for example, connections established separately using a macro base station and a home eNodeB) of a 3GPP access technology, the UE determines that a bearer QoS needs to be modified based on a service requirement (for example, a service requires higher bandwidth). A current solution is to modify a bearer QoS on each connection based on the service requirement. However, modifying the bearer QoS on each connection may cause an increase in a signaling processing quantity of the UE and the server, and consume additional resources. Therefore, how to reduce the signaling processing quantity when bearer QoS modification is performed in multipath transmission is an urgent problem that needs to be resolved currently.

SUMMARY

Embodiments of the present disclosure disclose a policy control method for multipath transmission, and a related device, to reduce a signaling processing quantity when resource modification is performed in multipath transmission.

A first aspect of the embodiments of the present disclosure discloses a policy control method for multipath transmission, where user equipment (UE) supporting multipath transmission performs service packet transmission using at least two transmission subflows. The method includes receiving, by a policy decision network element, association information of the at least two transmission subflows from a communication peer, where the association information includes flow identifiers of the at least two transmission subflows. The method also includes determining, by the policy decision network element, a resource modification policy of at least one transmission subflow in the at least two transmission subflows based on the association information, where the resource modification policy may include but is not limited to information such as a flow identifier of each transmission subflow in the at least one transmission subflow, and a type of a resource that needs to be modified and a modification amount on each transmission subflow. The method also includes sending, by the policy decision network element, the resource modification policy to a forwarding plane network element corresponding to the at least one transmission subflow, so that the forwarding plane network element corresponding to the at least one transmission subflow performs resource modification according to the resource modification policy. In other words, the policy decision network element may determine, based on the association information of the at least two transmission subflows on which a same service packet is transmitted, one or more transmission subflows on which resource modification needs to be performed, so that resource modification is performed on the one or more transmission subflows, instead of performing resource modification on each transmission subflow. Therefore, a signaling processing quantity can be reduced when resource modification is performed in multipath transmission, and resource consumption is reduced.

A second aspect of the embodiments of the present disclosure discloses a policy decision network element, where user equipment (UE) supporting multipath transmission performs service packet transmission using at least two transmission subflows, and the policy decision network element includes a processor, a memory, a communications interface, and a communications bus. The memory is configured to store a program and data. The communications bus is configured to establish connections and communication between the processor, the memory, and the communications interface. The processor is configured to invoke the program stored in the memory, to perform the following operations: triggering the communications interface to receive association information of the at least two transmission subflows from a communication peer, where the association information includes flow identifiers of the at least two transmission subflows; determining a resource modification policy of at least one transmission subflow in the at least two transmission subflows based on the association information; and triggering the communications interface to send the resource modification policy to a forwarding plane network element corresponding to the at least one transmission subflow, so that the forwarding plane network element corresponding to the at least one transmission subflow performs resource modification according to the resource modification policy.

A third aspect of the embodiments of the present disclosure discloses a policy control system for multipath transmission, including user equipment (UE), the policy decision network element disclosed in the second aspect of the embodiments of the present disclosure, and a communication peer.

In the embodiments of the present disclosure, when the user equipment (UE) supporting multipath transmission performs service packet transmission using the at least two transmission subflows, the policy decision network element receives the association information of the at least two transmission subflows from the communication peer. The policy decision network element may determine the resource modification policy of the at least one transmission subflow in the at least two transmission subflows based on the association information. The policy decision network element sends the resource modification policy to the forwarding plane network element corresponding to the at least one transmission subflow, so that the forwarding plane network element corresponding to the at least one transmission subflow performs resource modification according to the resource modification policy. It can be learned that, after the embodiments of the present disclosure are implemented, the policy decision network element may determine, based on the association information of the at least two transmission subflows on which the same service packet is transmitted, one or more transmission subflows on which resource modification needs to be performed, so that resource modification is performed on the one or more transmission subflows, instead of performing resource modification on each transmission subflow. Therefore, a signaling processing quantity can be reduced when resource modification is performed in multipath transmission, and resource consumption is reduced.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

DETAILED DESCRIPTION OF ILLUSTRATIVE EMBODIMENTS

The following describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure disclose a policy control method for multipath transmission, and a related device, to reduce a signaling processing quantity when resource modification is performed in multipath transmission, and further optimize a procedure. The following provides detailed descriptions separately.

Figure 1:
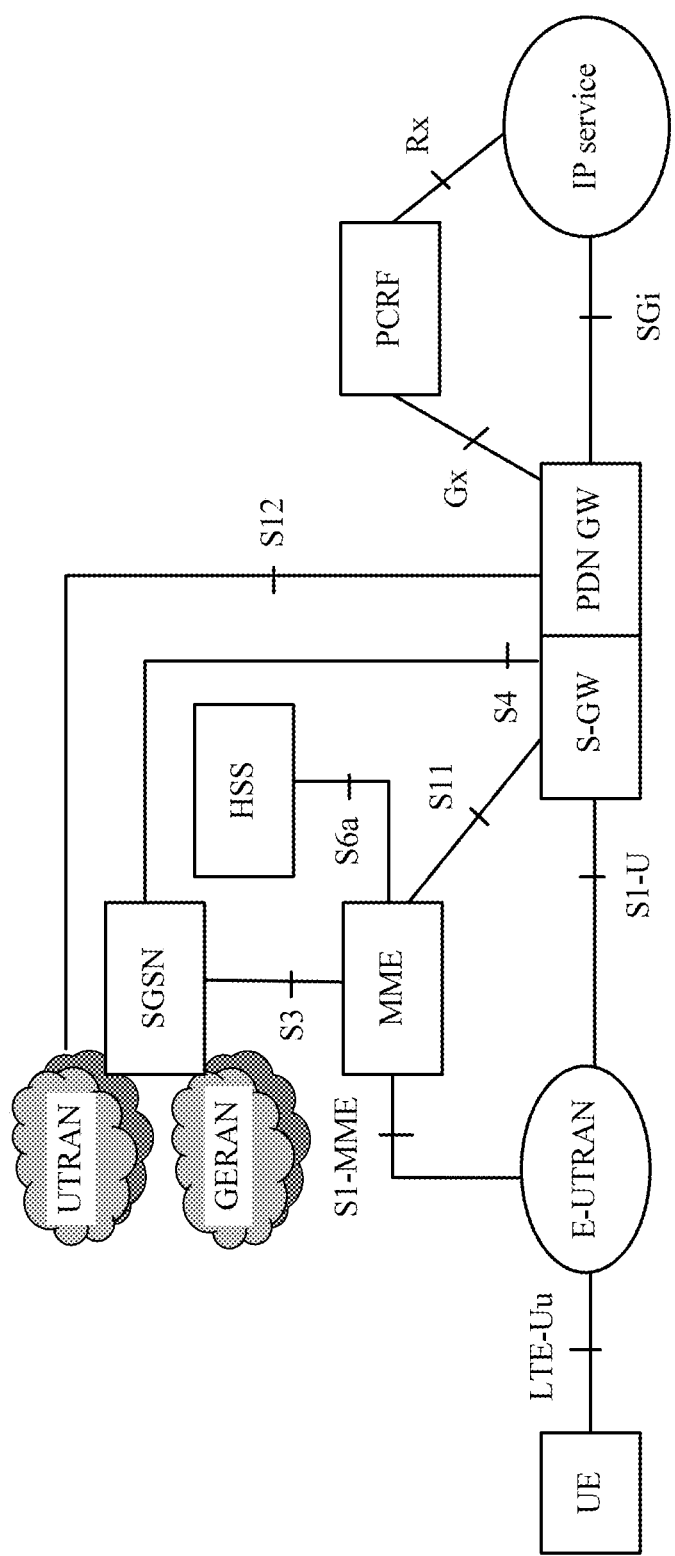
FIG. 1 is a schematic diagram of an EPS system architecture according to an embodiment of the present disclosure.

For better understanding of the embodiments of the present disclosure, a system architecture to which the embodiments of the present disclosure are applicable is first described below. The embodiments of the present disclosure may be applied to an EPS system, another evolved system of the system, or the like. An EPS system architecture disclosed in an embodiment of the present disclosure is described below. FIG. 1 is a schematic diagram of an EPS system architecture according to an embodiment of the present disclosure. The EPS system architecture shown in FIG. 1 may include user equipment (UE), an evolved universal terrestrial radio access network (E-UTRAN), and an evolved packet core (EPC). The user equipment (UE) may include but is not limited to a handheld device (such as a mobile phone, a tablet computer, or a personal digital assistant) with a wireless communication function, an in-vehicle device, a wearable device (such as a smartwatch or a smart band), a computing device or another processing device connected to a wireless modem, or UE in various forms, including a mobile station (MS), a terminal, terminal equipment, and the like. For ease of description, in this application, these devices are referred to as user equipment or UE. The E-UTRAN may include an eNodeB, the E-UTRAN and the UE are interconnected using an LTE-Uu interface, and the E-UTRAN and the EPC are interconnected using an S1 interface, to implement a function related to wireless access. The EPC may include components such as a mobility management entity (MME), a serving gateway (S-GW), a packet data network gateway (P-GW), a policy and charging rules function (PCRF), a serving GPRS support node (SGSN), and a home subscriber server (HSS).

In this embodiment of the present disclosure, the MME is configured to complete processing of signaling plane functions, such as user authentication, handover, roaming control, mobility management of a terminal in an idle state, and management of a user context and a bearer. The S-GW is a user plane function entity. The S-GW implements routing and forwarding of packet data, is used as a data anchor in a 3GPP system, terminates an interface towards the E-UTRAN, and is also a local mobility management anchor in an inter-E-UTRAN handover scenario in a specific geographical area. The P-GW is a gateway connected to an external data network, and is a user plane anchor between a 3GPP access network and a non-3GPP access network. The user equipment may be connected to the P-GW to create a packet data network (PDN) connection, to access an external packet data network. The PDN may be the Internet, a virtual private network (VPN), an IP multimedia service (IMS) network, a Wireless Application Protocol (WAP) network provided by an operator, or the like. The PCRF is a policy decision point for policy and charging control of a service data flow and an IP bearer resource, and maintains an association between a gateway control session and an IP-connectivity access network (IP-CAN) session. The SGSN is used to implement functions such as routing and forwarding of a packet, mobility management, session management, logical link management, authentication and encryption, and bill generation and output. The HSS is a database used to store user subscription information, and a home network may include one or more HSSs. The HSS is responsible for storing user-related information, such as a user identifier, a number, routing information, security information, location information, and profile information. In actual network deployment, the S-GW and the P-GW may be separated or integrated. For example, in a non-roaming scenario, the S-GW and the P-GW are deployed through integration. In a roaming scenario, the S-GW and the P-GW are separately deployed, and are connected using an S5 interface.

Figure 2:
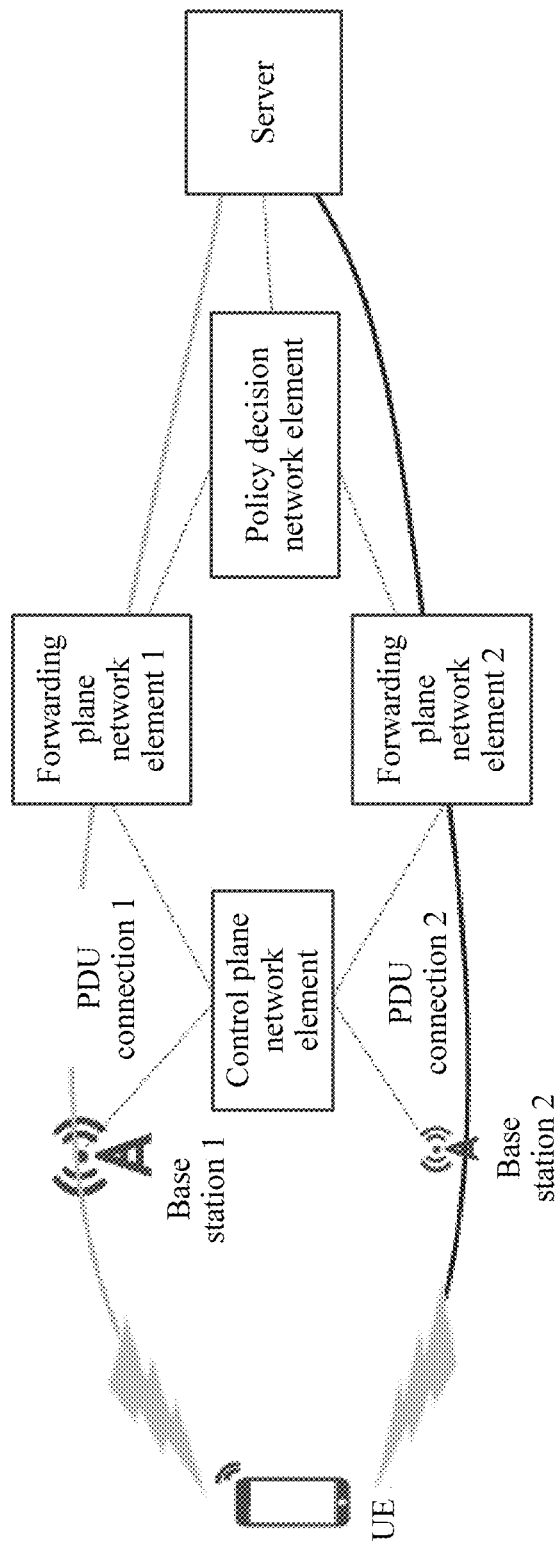
FIG. 2 is a schematic diagram of a network architecture of multipath transmission according to an embodiment of the present disclosure.

FIG. 2 is a schematic diagram of a network architecture of multipath transmission according to an embodiment of the present disclosure. The network architecture shown in FIG. 2 may include UE, at least two base stations, a control plane network element, at least two forwarding plane network elements, a policy decision network element, and a server. The UE is user equipment that can support multipath transmission, for example, user equipment supporting an MPTCP transmission protocol, or user equipment supporting a quick UDP internet connection (QUIC) transmission protocol. The control plane network element may be a control plane function network element responsible for user context and session management, for example, an MME or a mobile network controller. The forwarding plane network element may be a forwarding plane function network element that implements processing functions such as forwarding and statistics collection of a user packet, for example, a P-GW, an S-GW, a GW forwarding plane, or a software-defined networking (SDN) switch. The policy decision network element may be a function network element responsible for performing policy control and/or charging control on a mobile network, for example, a PCRF in an EPC network. The server is a server that can support multipath transmission, and is a network element that can provide a service for a user, for example, an application server supporting the MPTCP transmission protocol. In the network architecture shown in FIG. 2, one user equipment (UE) has a plurality of network interfaces, so that a plurality of links to a target node can be implemented. Specifically, the UE establishes a corresponding packet data unit (PDU) connection using a base station and a corresponding forwarding plane network element, for example, a PDN connection, and may establish one or more transmission subflows on each PDU connection. Multipath transmission may be implemented using the MPTCP protocol, or may be implemented using the QUIC protocol. This is not limited in this embodiment of the present disclosure.

In the network architecture shown in FIG. 2, the UE separately establishes corresponding PDU connections (namely, a PDU connection 1 and a PDU connection 2) using a base station 1 and a base station 2, and establishes corresponding transmission subflows, so that the UE can perform service packet transmission on the two transmission subflows. For example, the UE transmits service packets of a same application on the two transmission subflows. The base station 1 and the base station 2 are two different base stations. The base station 1 may be a macro base station, and the base station 2 may be a micro base station, such as a home NodeB. When the UE performs service packet transmission on the two transmission subflows, the policy decision network element may receive association information of the two transmission subflows from the UE or the server, so that the policy decision network element learns that a same service is transmitted on the two transmission subflows. The policy decision network element may determine, based on at least one type of information of load statuses, air interface types, and base station types of the two transmission subflows, one or two transmission subflows that are of the two transmission subflows and on which resource modification needs to be performed. Therefore, a signaling processing quantity can be reduced when resource modification is performed in multipath transmission, a procedure is further optimized, and system resource consumption is reduced. Although FIG. 2 shows only a case in which the UE establishes two PDU connections using two base stations (the base station 1 and the base station 2), this imposes no limitation on this embodiment of the present disclosure. The UE may establish at least two PDU connections to a plurality of base stations, that is, the UE may perform service packet transmission using at least two transmission subflows.

Figure 3:
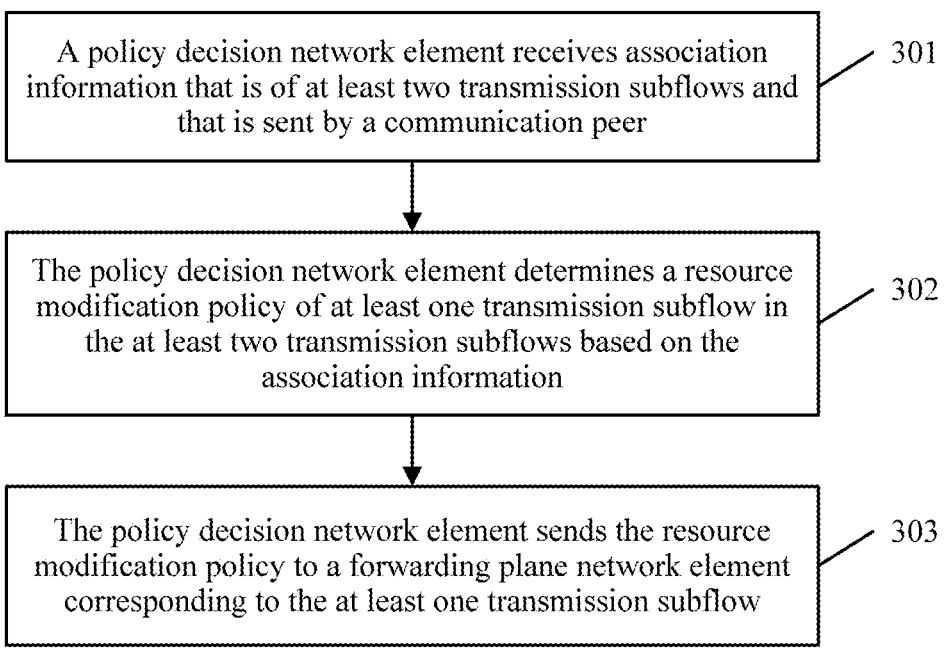
FIG. 3 is a schematic flowchart of a policy control method for multipath transmission according to an embodiment of the present disclosure.

Based on the network architecture of multipath transmission shown in FIG. 2, an embodiment of the present disclosure discloses a policy control method for multipath transmission. FIG. 3 is a schematic flowchart of a policy control method for multipath transmission according to an embodiment of the present disclosure. As shown in FIG. 3, the policy control method for multipath transmission may include the following steps.

301. A policy decision network element receives association information of at least two transmission subflows from a communication peer.

In this embodiment of the present disclosure, user equipment (UE) may perform service packet transmission using the at least two transmission subflows. The UE is user equipment supporting multipath transmission, that is, the UE may transmit a same service packet on the at least two transmission subflows. Before performing service packet transmission, the UE may first establish a plurality of PDU connections, for example, PDN connections, and may establish one or more corresponding transmission subflows on each PDU connection. The at least two transmission subflows used for service packet transmission are transmission subflows corresponding to different PDU connections. The UE establishes different PDU connections to different base stations and forwarding plane network elements. For example, the UE establishes a PDU connection 1 to a base station 1 and a forwarding plane network element 1, and the UE establishes a PDU connection 2 to a base station 2 and a forwarding plane network element 2.

In this embodiment of the present disclosure, when the UE transmits the same service packet on the at least two transmission subflows, the policy decision network element may receive the association information of the at least two transmission subflows from the communication peer. The association information is used to indicate that the same service packet is transmitted on the at least two transmission subflows. The association information may include flow identifiers of the at least two transmission subflows. Different transmission subflows have different flow identifiers. The flow identifiers may be used to distinguish between the different transmission subflows. Specifically, when the association information includes more than one flow identifiers, it may indicate that a same service packet is transmitted on transmission subflows corresponding to these flow identifiers.

In this embodiment of the present disclosure, the communication peer may be the UE, or may be a server supporting multipath transmission, for example, an application server.

In this embodiment of the present disclosure, after the at least two transmission subflows are established, the communication peer may initiate a resource establishment request, to request to establish or activate one or some resources corresponding to each transmission subflow. For example, the UE may initiate a dedicated bearer activation request (namely, the resource establishment request) using each transmission subflow, to activate a dedicated bearer corresponding to each transmission subflow. In addition, when detecting that resource modification needs to be performed on a transmission subflow, the communication peer may initiate a resource modification request on the transmission subflow. The communication peer may detect, in real time, a service packet transmission status (for example, a quantity of packet losses or packet loss frequency) on each transmission subflow, to determine whether resource modification needs to be performed on a transmission subflow. For example, when a quantity of packet losses on a transmission subflow is greater than a preset value, the communication peer may consider that the transmission subflow requires higher bandwidth, and therefore may determine that resource modification needs to be performed on the transmission subflow. Therefore, the communication peer may initiate a resource modification request on the transmission subflow.

Specifically, a specific implementation of step 301 that a policy decision network element receives association information of at least two transmission subflows from a communication peer may include the following step.

(31) The policy decision network element receives, in a resource establishment process, the association information of the at least two transmission subflows from the communication peer.

(32) Alternatively, the policy decision network element receives, in a resource modification process, the association information of the at least two transmission subflows from the communication peer.

The resource establishment process and the resource modification process are two different processes described above. When the association information is received in the resource establishment process, the communication peer may add the association information of the at least two transmission subflows to a resource establishment request initiated on one of the transmission subflows. When the association information is received in the resource modification process, the communication peer may add the association information of the at least two transmission subflows to an initiated resource modification request.

302. The policy decision network element determines a resource modification policy of at least one transmission subflow in the at least two transmission subflows based on the association information.

In this embodiment of the present disclosure, the policy decision network element may determine the resource modification policy of the at least one transmission subflow in the at least two transmission subflows based on the received association information. Specifically, the policy decision network element first determines the at least one transmission subflow, and then further determines the resource modification policy of the at least one transmission subflow. The at least one transmission subflow may be any one or more of the at least two transmission subflows, or may be a transmission subflow on which resource modification needs to be performed and that is determined with reference to information such as a load status, an air interface type, and a base station type of each transmission subflow.

In this embodiment of the present disclosure, the resource modification policy may include but is not limited to information such as a flow identifier of each transmission subflow in the at least one transmission subflow, and a type of a resource that needs to be modified and a modification amount on each transmission subflow. The type of the resource that needs to be modified means which type of resource is to be modified, and may be a quality of service (QoS) parameter. Further, the QoS parameter may include a QoS class identifier (QCI), used to measure resource information such as a packet loss rate, a delay, bandwidth, and a priority during service transmission, to modify these resources. The modification amount means an amount by which a resource is modified. For example, if bandwidth on a transmission subflow is to be increased by 5 M, the type of the resource that needs to be modified is the bandwidth, and the modification amount is 5 M.

Optionally, a specific implementation of step 302 that the policy decision network element determines a resource modification policy of at least one transmission subflow in the at least two transmission subflows based on the association information may include the following steps.

(33) The policy decision network element obtains at least one type of information of load statuses, air interface types, and base station types of the at least two transmission subflows based on the association information.

(34) The policy decision network element determines the resource modification policy of the at least one transmission subflow in the at least two transmission subflows based on the at least one type of information of the load statuses, the air interface types, and the base station types of the at least two transmission subflows.

The information such as the load statuses, the air interface types, and the base station types of the at least two transmission subflows may be reported by a network management system or a radio access network (RAN) to the policy decision network element in real time or at a specific interval, or may be proactively obtained by the policy decision network element from a network management system or a RAN side. For example, the UE transmits a same service packet using two transmission subflows (for example, a transmission subflow 1 and a transmission subflow 2). It is assumed that maximum bandwidth on each of the transmission subflow 1 and the transmission subflow 2 is 5 M, 4 M bandwidth has been occupied on the transmission subflow 1, and 2 M bandwidth has been occupied on the transmission subflow 2. If resource modification needs to be performed when resource usage exceeds 60%, it may be determined that resource modification needs to be performed on the transmission subflow 1.

In an optional implementation, before step 302 is performed, the method described in FIG. 3 may further include the following step.

(35) The policy decision network element receives, in the resource modification process, a policy control modification request from a forwarding plane network element, where the forwarding plane network element is a forwarding plane network element corresponding to one of the at least two transmission subflows.

A specific implementation of step 302 that the policy decision network element determines a resource modification policy of at least one transmission subflow in the at least two transmission subflows based on the association information may include the following step.

(36) The policy decision network element responds to the policy control modification request, and determines the resource modification policy of the at least one transmission subflow in the at least two transmission subflows based on the association information.

In this implementation, the policy decision network element may receive, in the resource modification process, the policy control modification request from the forwarding plane network element. The policy control modification request may be used to instruct the policy decision network element to determine the resource modification policy of the at least one transmission subflow in the at least two transmission subflows based on the association information. The forwarding plane network element is the forwarding plane network element corresponding to one of the at least two transmission subflows. Specifically, the forwarding plane network element may be a forwarding plane network element corresponding to a transmission subflow on which a resource modification request is initiated.

Optionally, a specific implementation of step (36) that the policy decision network element determines the resource modification policy of the at least one transmission subflow in the at least two transmission subflows based on the association information may be as follows: The policy decision network element obtains at least one type of information of load statuses, air interface types, and base station types of the at least two transmission subflows based on the association information; and determines the resource modification policy of the at least one transmission subflow in the at least two transmission subflows based on the at least one type of information of the load statuses, the air interface types, and the base station types of the at least two transmission subflows.

In an optional implementation, before step 302 is performed, the method described in FIG. 3 may further include the following step.

(37) The policy decision network element receives, in the resource modification process, a resource modification request from the communication peer.

A specific implementation of step 302 that the policy decision network element determines a resource modification policy of at least one transmission subflow in the at least two transmission subflows based on the association information may include the following step.

(38) The policy decision network element responds to the resource modification request, and determines the resource modification policy of the at least one transmission subflow in the at least two transmission subflows based on the association information.

In this implementation, the policy decision network element may receive, in the resource modification process, the resource modification request from the communication peer. The resource modification request may be used to instruct the policy decision network element to determine the resource modification policy of the at least one transmission subflow in the at least two transmission subflows based on the association information.

Optionally, a specific implementation of step (38) that the policy decision network element determines the resource modification policy of the at least one transmission subflow in the at least two transmission subflows based on the association information may be as follows: The policy decision network element obtains at least one type of information of load statuses, air interface types, and base station types of the at least two transmission subflows based on the association information; and determines the resource modification policy of the at least one transmission subflow in the at least two transmission subflows based on the at least one type of information of the load statuses, the air interface types, and the base station types of the at least two transmission subflows.

303. The policy decision network element sends the resource modification policy to a forwarding plane network element corresponding to the at least one transmission subflow.

In this embodiment of the present disclosure, after determining the resource modification policy of the at least one transmission subflow, the policy decision network element may send the resource modification policy to the forwarding plane network element corresponding to the at least one transmission subflow, so that the forwarding plane network element corresponding to the at least one transmission subflow performs resource modification according to the resource modification policy. One transmission subflow corresponds to one forwarding plane network element, and forwarding plane network elements corresponding to different transmission subflows may be different. After receiving a resource modification policy, a forwarding plane network element may parse the resource modification policy to obtain a modification policy of a transmission subflow corresponding to the forwarding plane network element, and perform resource modification according to the modification policy. For example, the forwarding plane network element 1 receives a resource modification policy; parses the resource modification policy to obtain a modification policy of the transmission subflow 1 corresponding to the forwarding plane network element 1, for example, a type of a resource that needs to be modified and a modification amount; and performs corresponding resource modification on the transmission subflow 1 based on the type of the resource and the modification amount.

In the method described in FIG. 3, when the UE supporting multipath transmission performs service packet transmission using the at least two transmission subflows, the policy decision network element receives the association information of the at least two transmission subflows from the communication peer; may determine the resource modification policy of the at least one transmission subflow in the at least two transmission subflows based on the association information; and sends the resource modification policy to the forwarding plane network element corresponding to the at least one transmission subflow, so that the forwarding plane network element corresponding to the at least one transmission subflow performs resource modification according to the resource modification policy. After the method described in FIG. 3 is implemented, the policy decision network element may determine, based on the association information of the at least two transmission subflows on which the same service packet is transmitted, one or more transmission subflows on which resource modification needs to be performed, so that resource modification is performed on the one or more transmission subflows, instead of performing resource modification on each transmission subflow. Therefore, a signaling processing quantity can be reduced when resource modification is performed in multipath transmission, a processing procedure is further optimized, and system resource consumption is reduced.

Figure 4A:
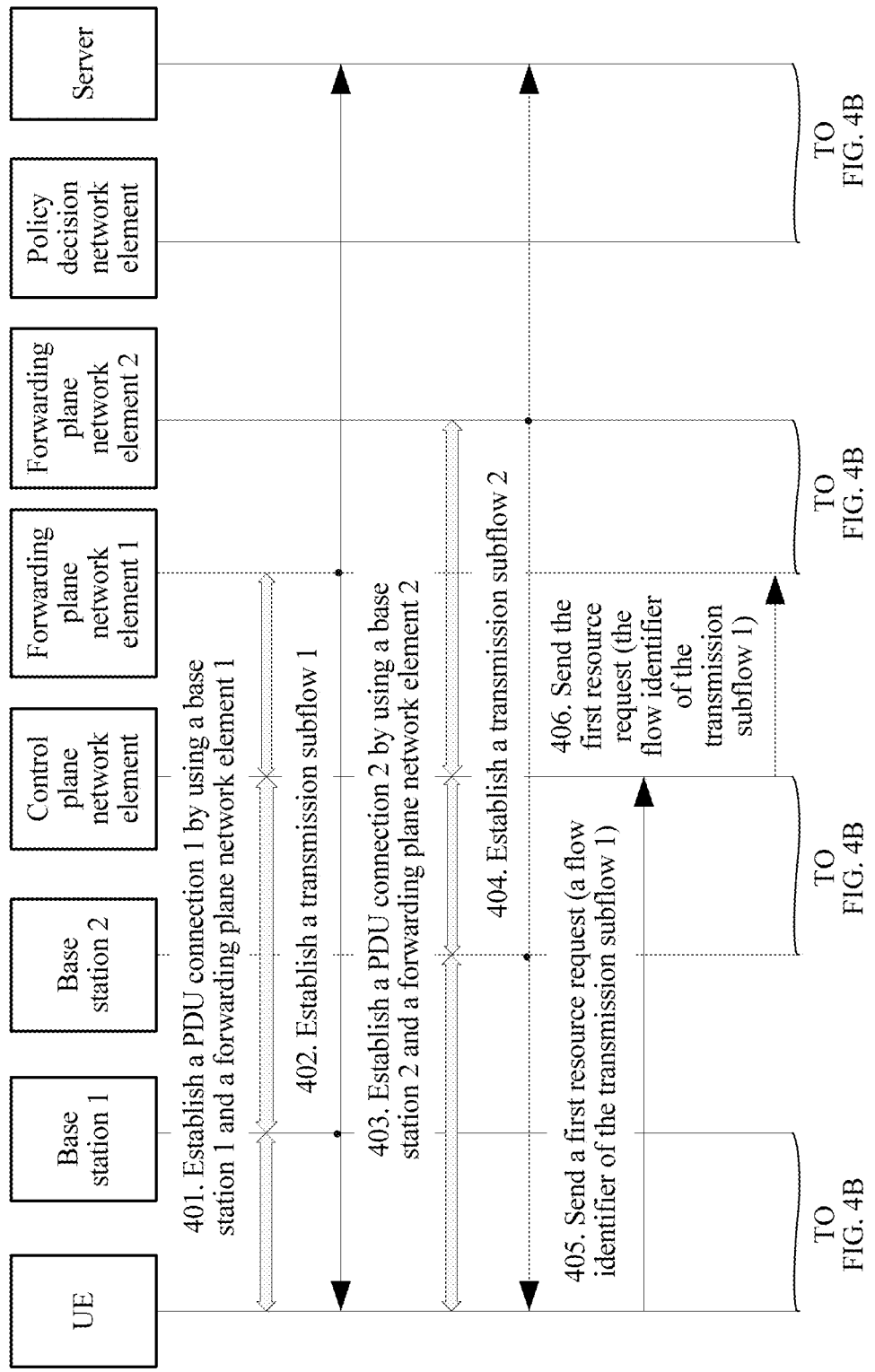
FIG. 4A to FIG. 4C are a schematic flowchart of another policy control method for multipath transmission according to an embodiment of the present disclosure.
Figure 4B:
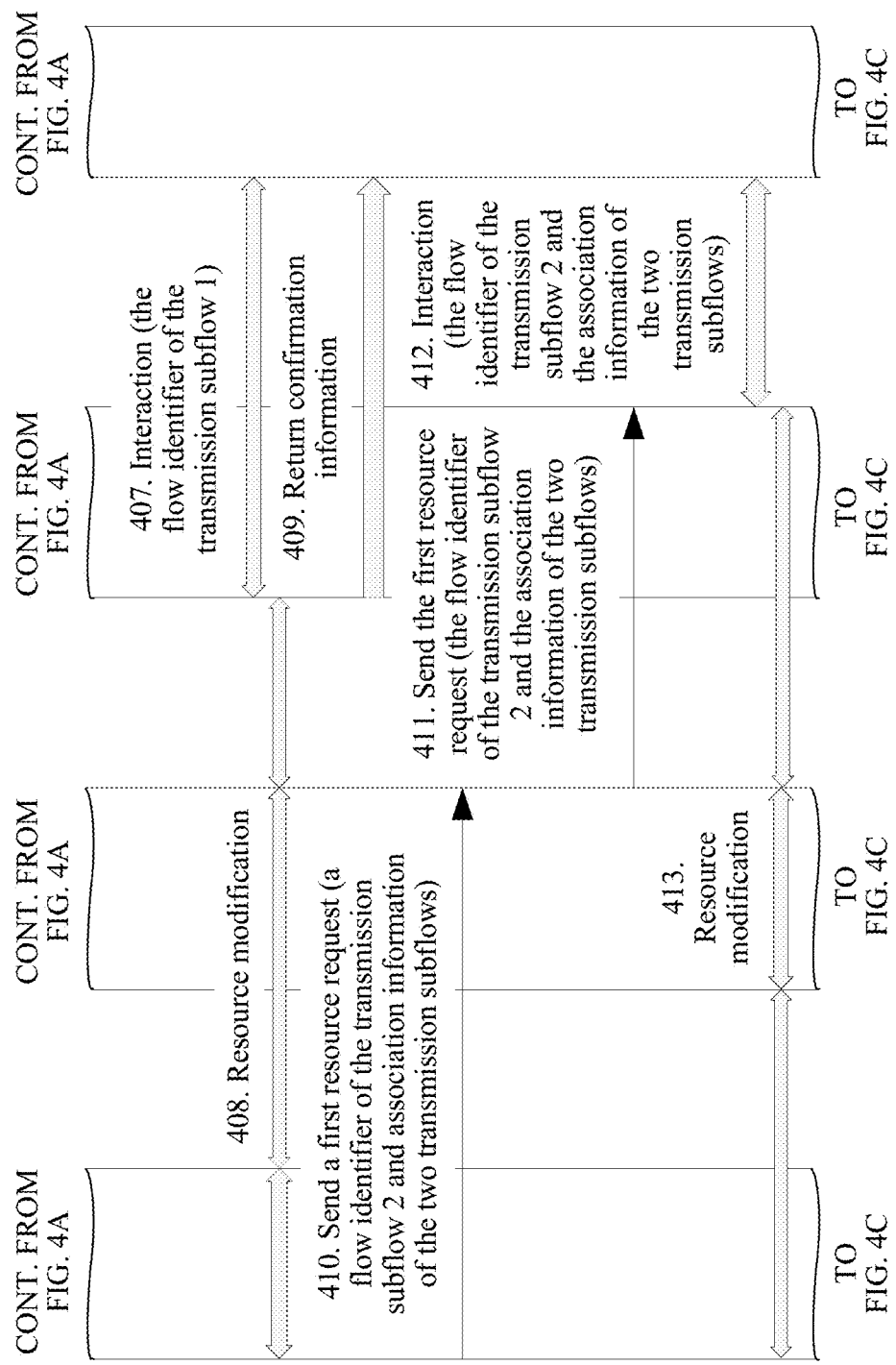
Figure 4C:
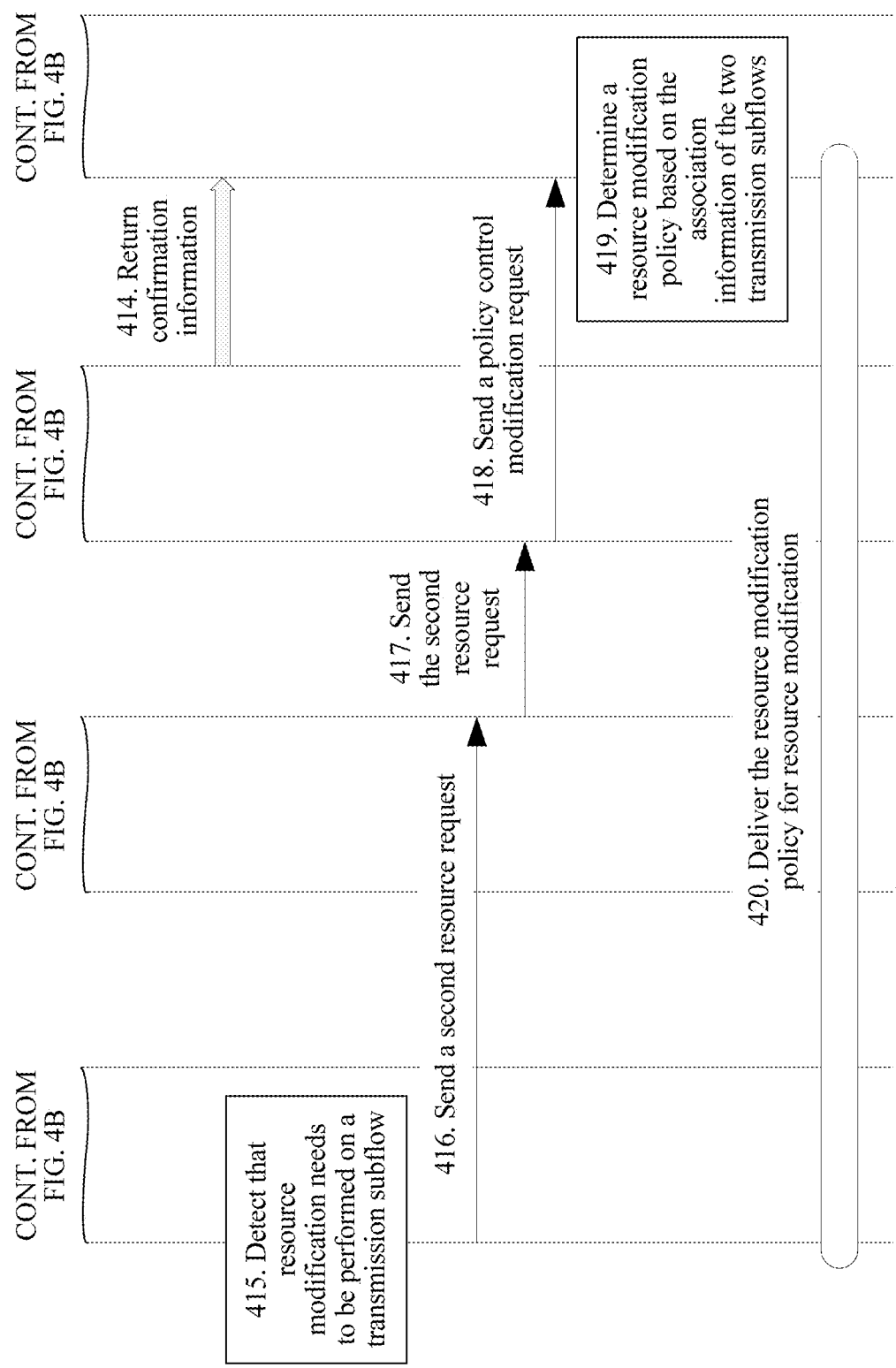

Based on the network architecture of multipath transmission shown in FIG. 2, an embodiment of the present disclosure discloses another policy control method for multipath transmission. FIG. 4A to FIG. 4C are a schematic flowchart of another policy control method for multipath transmission according to an embodiment of the present disclosure. In the policy control method for multipath transmission, association information is transmitted in a resource establishment process, and a communication peer is user equipment (UE). The UE may perform service packet transmission using at least two transmission subflows, and an example in which the UE performs service packet transmission using two transmission subflows is used herein for detailed description. As shown in FIG. 4A to FIG. 4C, the policy control method for multipath transmission may include the following steps.

401. The UE establishes a PDU connection 1 using a base station 1 and a forwarding plane network element 1.

402. The UE establishes, for the PDU connection 1 using the base station 1 and the forwarding plane network element 1, a transmission subflow 1 on which the UE communicates with a server.

403. The UE establishes a PDU connection 2 using a base station 2 and a forwarding plane network element 2.

404. The UE establishes, for the PDU connection 2 using the base station 2 and the forwarding plane network element 2, a transmission subflow 2 on which the UE communicates with the server.

In this embodiment of the present disclosure, the UE supporting multipath transmission may establish a plurality of PDU connections, and may establish one or more corresponding transmission subflows on each PDU connection. Herein, an example in which one transmission subflow is established on one PDU connection is used for description. The UE may transmit a same service packet using the transmission subflow 1 corresponding to the PDU connection 1 and the transmission subflow 2 corresponding to the PDU connection 2.

In this embodiment of the present disclosure, the base station 1 and the base station 2 are two different base stations. For example, the base station 1 is a macro base station, and the base station 2 is a micro base station.

405. The UE sends a first resource request to a control plane network element using the PDU connection 1, where the first resource request carries a flow identifier of the transmission subflow 1.

406. The control plane network element sends, to the forwarding plane network element 1, the first resource request transmitted by the UE using the PDU connection 1.

407. The forwarding plane network element 1 interacts with a policy decision network element.

408. The forwarding plane network element 1 performs corresponding resource modification on the transmission subflow 1 using the control plane network element, the base station 1, and the UE.

In this embodiment of the present disclosure, the first resource request transmitted on the PDU connection 1 may be a resource establishment request, namely, a request to establish one or some resources on the connection. The request may include the flow identifier of the transmission subflow 1 and information about a resource that the UE requests to establish. The forwarding plane network element 1 may establish an IP-CAN session based on the first resource request, to implement interaction with the policy decision network element. Specifically, the forwarding plane network element 1 sends a session request to the policy decision network element. The session request may carry the flow identifier of the transmission subflow 1. The policy decision network element responds to the session request, and may initiate policy modification using a policy enforcement network element. The policy decision network element delivers a modification policy to the forwarding plane network element 1, so that the forwarding plane network element 1 initiates corresponding resource modification according to the modification policy. In this case, the resource modification is to establish or activate a requested resource.

409. After completing the resource modification, the forwarding plane network element 1 returns confirmation information to the policy decision network element, to indicate that the requested resource modification has been performed.

In this embodiment of the present disclosure, after completing resource establishment, the forwarding plane network element 1 may return the confirmation information to the policy decision network element, to notify the policy decision network element that the requested resource has been successfully established.

410. The UE sends a first resource request to the control plane network element using the PDU connection 2, where the first resource request carries a flow identifier of the transmission subflow 2 and association information of the transmission subflow 1 and the transmission subflow 2.

411. The control plane network element sends, to the forwarding plane network element 2, the first resource request transmitted by the UE using the PDU connection 2.

412. The forwarding plane network element 2 interacts with the policy decision network element.

413. The forwarding plane network element 2 performs corresponding resource modification on the transmission subflow 2 using the control plane network element, the base station 2, and the UE.

Similarly, the first resource request transmitted on the PDU connection 2 may be a resource establishment request, namely, a request to establish one or some resources on the connection. The request may include the flow identifier of the transmission subflow 2, the association information of the two transmission subflows, and information about a resource that the UE requests to establish. The forwarding plane network element 2 may establish an IP-CAN session based on the first resource request, to implement interaction with the policy decision network element. Specifically, the forwarding plane network element 2 sends a session request to the policy decision network element. The session request may carry the flow identifier of the transmission subflow 2 and the association information of the transmission subflow 1 and the transmission subflow 2. The policy decision network element responds to the session request, and may initiate policy modification using the policy enforcement network element. The policy decision network element delivers a modification policy to the forwarding plane network element 2, so that the forwarding plane network element 2 initiates corresponding resource modification according to the modification policy. In this case, the resource modification is to establish or activate a requested resource.

414. After completing the resource modification, the forwarding plane network element 2 returns confirmation information to the policy decision network element, to indicate that the requested resource modification has been performed.

It may be understood that step 405 to step 409 and step 410 to step 414 may be performed sequentially, synchronously, or alternately. This is not limited in this embodiment of the present disclosure. The association information of the transmission subflow 1 and the transmission subflow 2 may be transmitted on one of the transmission subflows. Step 405 to step 414 may be considered as a resource establishment process, and the association information is transmitted in the resource establishment process.

415. The UE detects that resource modification needs to be performed on a transmission subflow.

In this embodiment of the present disclosure, the UE may detect, in real time or at a specific interval, whether resource modification needs to be performed on the transmission subflow 1 and the transmission subflow 2. Specifically, the UE may determine, based on data transmission statuses of the transmission subflow 1 and the transmission subflow 2, whether resource modification needs to be performed. For example, when a quantity of packet losses of data transmitted on the transmission subflow 1 is greater than a preset value, the UE may consider that the transmission subflow 1 requires higher bandwidth, that is, detect that resource modification needs to be performed on the transmission subflow 1.

416. The UE sends a second resource request to the control plane network element on the transmission subflow.

In this embodiment of the present disclosure, the second resource request may be a resource modification request. When detecting that resource modification needs to be performed on the transmission subflow 1, the UE may send the second resource request on the transmission subflow 1. When detecting that resource modification needs to be performed on the transmission subflow 2, the UE may send the second resource request on the transmission subflow 2. Herein, an example in which resource modification needs to be performed on the transmission subflow 1 is used for description.

417. The control plane network element forwards the second resource request to the forwarding plane network element 1.

418. The forwarding plane network element 1 sends a policy control modification request to the policy decision network element.

419. The policy decision network element responds to the policy control modification request, and determines a resource modification policy of at least one transmission subflow in the transmission subflow 1 and the transmission subflow 2 based on the association information.

In this embodiment of the present disclosure, the policy decision network element responds to the policy control modification request from the forwarding plane network element, and determines the resource modification policy of the at least one transmission subflow based on the received association information of the transmission subflow 1 and the transmission subflow 2. The at least one transmission subflow may be any one or two of the transmission subflow 1 and the transmission subflow 2, or may be one or two transmission subflows that are of the transmission subflow 1 and the transmission subflow 2 and on which resource modification needs to be performed. The policy control modification request is also transmitted when the forwarding plane network element establishes the IP-CAN session with the policy decision network element.

Optionally, a specific implementation of step 419 that the policy decision network element determines a resource modification policy of at least one transmission subflow in the transmission subflow 1 and the transmission subflow 2 based on the association information may be as follows.

The policy decision network element obtains at least one type of information of load statuses, air interface types, and base station types of the transmission subflow 1 and the transmission subflow 2 based on the association information; and determines the resource modification policy of the at least one transmission subflow in the transmission subflow 1 and the transmission subflow 2 based on the at least one type of information of the load statuses, the air interface types, and the base station types of the transmission subflow 1 and the transmission subflow 2.

420. The policy decision network element delivers the resource modification policy for resource modification.

Specifically, a specific implementation of step 420 that the policy decision network element delivers the resource modification policy for resource modification may include the following steps.

(41) The policy decision network element sends the resource modification policy to a forwarding plane network element corresponding to the at least one transmission subflow.

(42) The forwarding plane network element corresponding to the at least one transmission subflow performs corresponding resource modification according to the resource modification policy.

When the at least one transmission subflow is the transmission subflow 1, the policy decision network element sends the resource modification policy to the forwarding plane network element 1, so that the forwarding plane network element 1 performs corresponding resource modification according to the resource modification policy. When the at least one transmission subflow is the transmission subflow 2, the policy decision network element sends the resource modification policy to the forwarding plane network element 2, so that the forwarding plane network element 2 performs corresponding resource modification according to the resource modification policy. When the at least one transmission subflow is the transmission subflow 1 and the transmission subflow 2, the policy decision network element separately sends the resource modification policy to the forwarding plane network element 1 and the forwarding plane network element 2, so that the forwarding plane network element 1 and the forwarding plane network element 2 separately perform corresponding resource modification according to the resource modification policy.

In this embodiment of the present disclosure, the method described in FIG. 4A to FIG. 4C may further include the following step.

(43) After completing the resource modification, the forwarding plane network element corresponding to the at least one transmission subflow returns confirmation information to the policy decision network element, to indicate that the requested resource modification has been performed.

When the at least one transmission subflow is the transmission subflow 1, after completing the resource modification, the forwarding plane network element 1 may return the confirmation information to the policy decision network element, to notify the policy decision network element that the requested resource modification has been performed. When the at least one transmission subflow is the transmission subflow 2, after completing the resource modification, the forwarding plane network element 2 may return the confirmation information to the policy decision network element, to notify the policy decision network element that the requested resource modification has been performed. When the at least one transmission subflow is the transmission subflow 1 and the transmission subflow 2, after completing the resource modification, the forwarding plane network element 1 and the forwarding plane network element 2 may separately return the confirmation information to the policy decision network element, to separately indicate that the requested resource modification has been performed.

It may be understood that, when detecting that resource modification needs to be performed on the transmission subflow 2 in step 415, the UE may send the second resource request on the transmission subflow 2. For a specific implementation process, refer to step 416 to step 420. Details are not described herein again. Step 415 to step 420 may be considered as a resource modification process.

In an optional implementation, when the UE can establish a bearer, the first resource request transmitted by the UE using each of the PDU connection 1 and the PDU connection 2 may be a dedicated bearer activation request, and the resource modification may be dedicated bearer activation. In this case, step 405 to step 409 are an activation process of a dedicated bearer on the transmission subflow 1, and step 410 to step 414 are an activation process of a dedicated bearer on the transmission subflow 2. When the UE detects that resource modification needs to be performed on a transmission subflow in step 415, the second resource request transmitted on the transmission subflow may be a dedicated bearer modification request. Correspondingly, the resource modification policy of the at least one transmission subflow and that is determined by the policy decision network element based on the association information of the two transmission subflows may be a bearer QoS modification policy of the at least one transmission subflow. The bearer QoS modification policy is delivered to a corresponding forwarding plane network element, so that the corresponding forwarding plane network element initiates bearer QoS modification, and returns confirmation information to the policy decision network element, to indicate that the requested bearer QoS modification has been performed.

In this embodiment of the present disclosure, after the method described in FIG. 4A to FIG. 4C is implemented, the UE separately establishes PDU connections using a plurality of different base stations, and establishes corresponding transmission subflows. The UE may notify the policy decision network element of flow identifiers of the transmission subflows and association information of the plurality of transmission subflows in a resource establishment process. When the UE detects that resource modification needs to be performed on one of the transmission subflows, in a resource modification process, the policy decision network element determines, based on the association information, one or more transmission subflows for resource modification. Therefore, a signaling processing quantity can be reduced when resource modification is performed in multipath transmission, a processing procedure is further optimized, and system resource consumption is reduced.

Figure 5A:
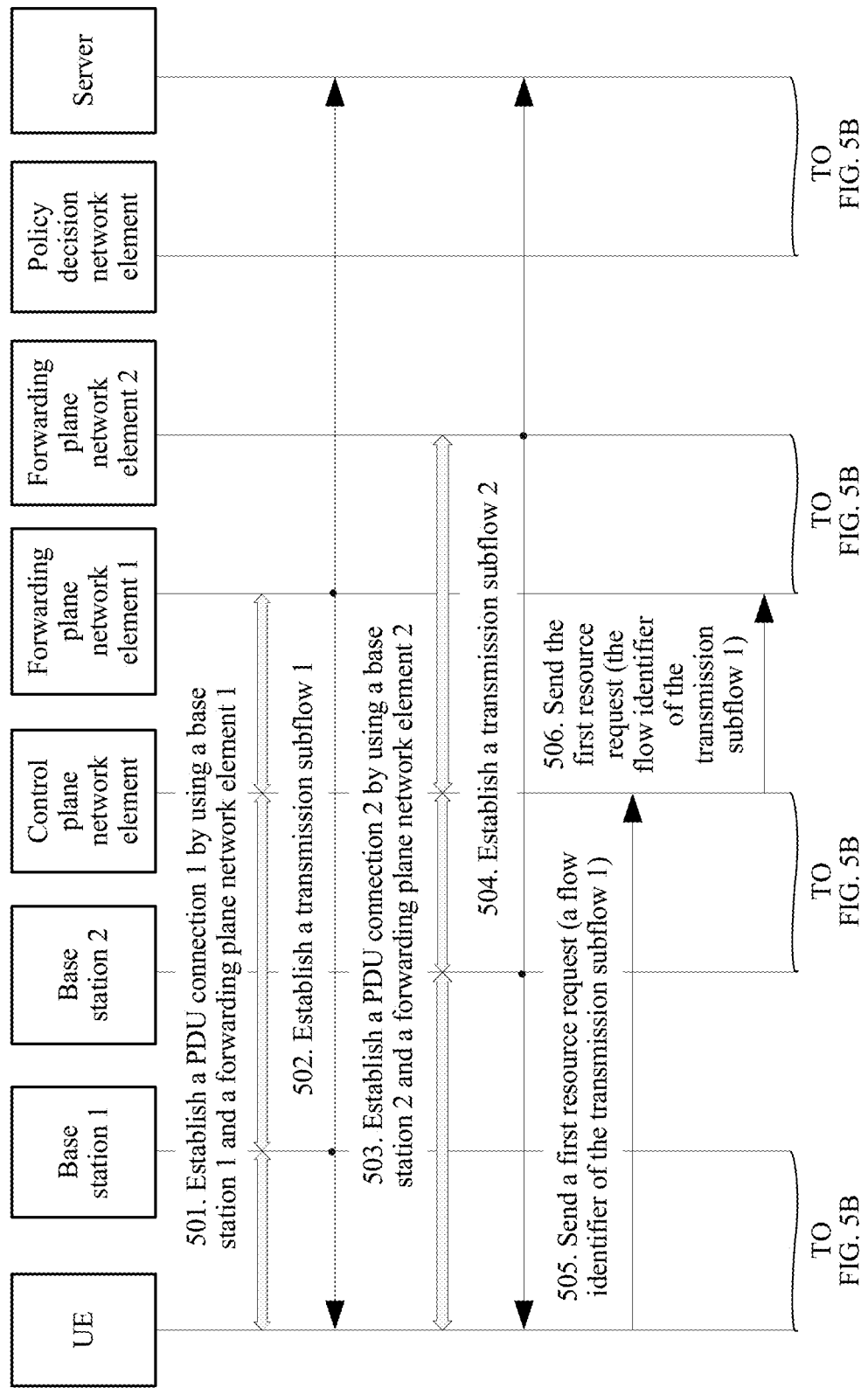
FIG. 5A to FIG. 5C are a schematic flowchart of another policy control method for multipath transmission according to an embodiment of the present disclosure.
Figure 5B:
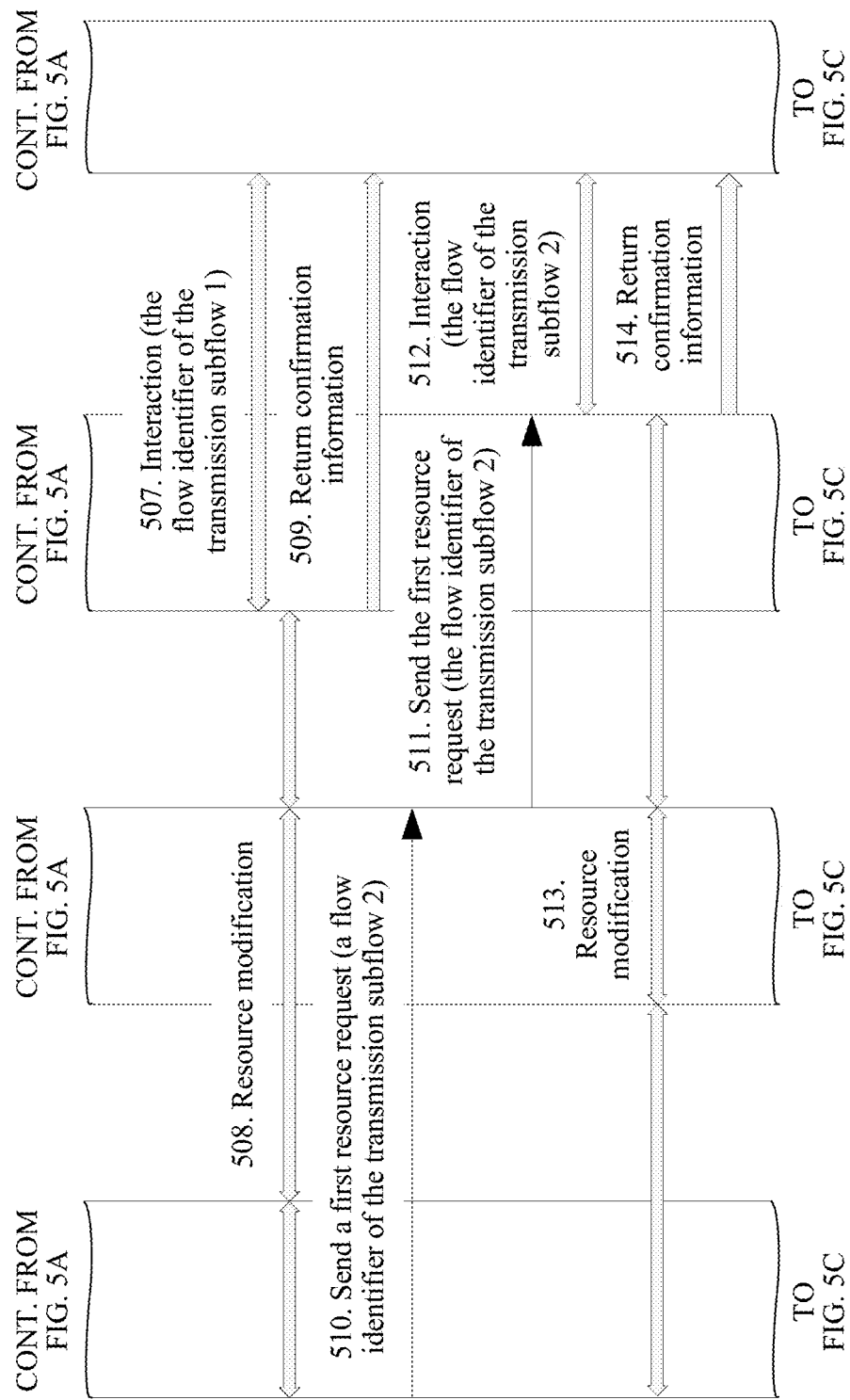
Figure 5C:
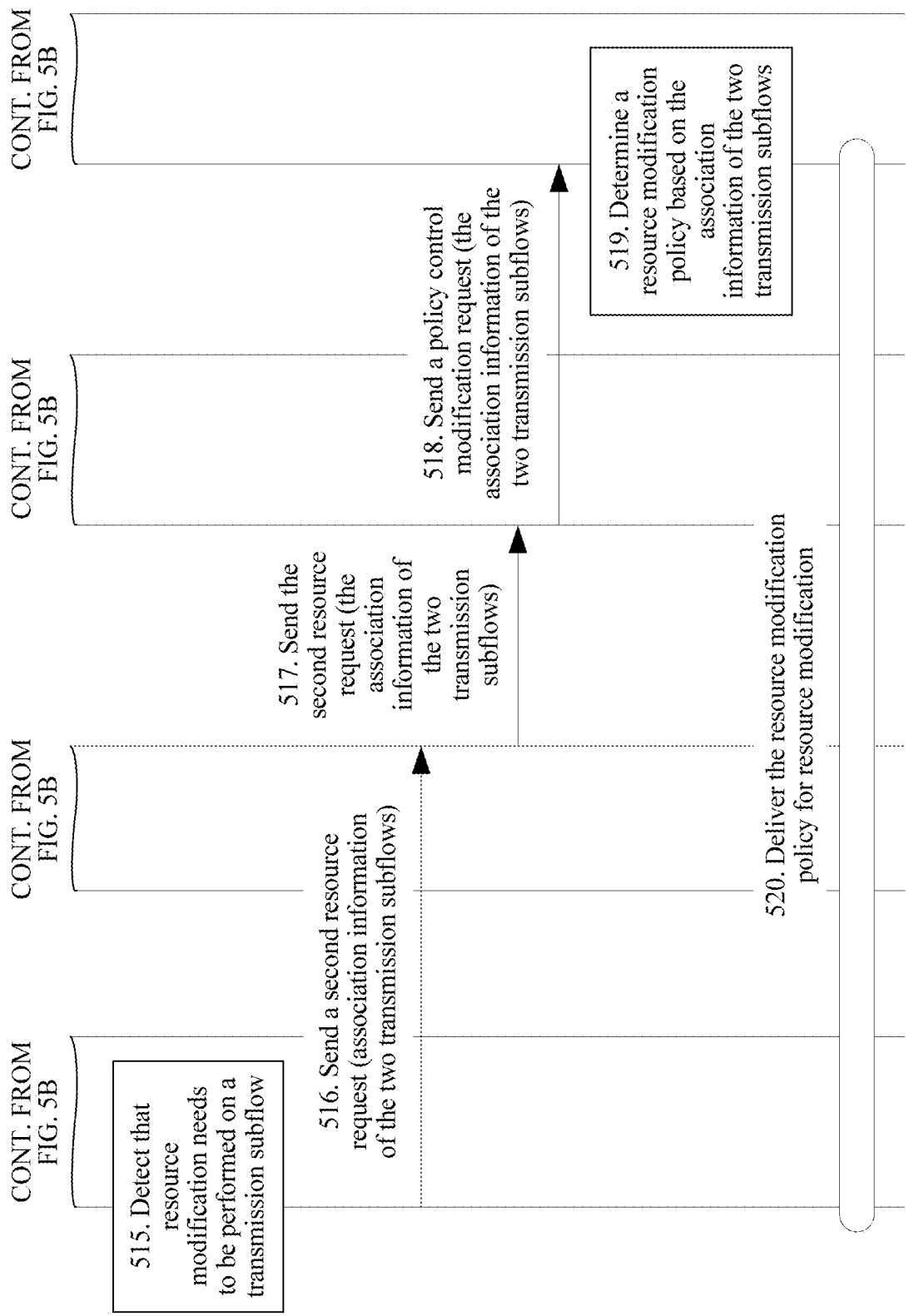

Based on the network architecture of multipath transmission shown in FIG. 2, an embodiment of the present disclosure discloses another policy control method for multipath transmission. FIG. 5A to FIG. 5C are a schematic flowchart of another policy control method for multipath transmission according to an embodiment of the present disclosure. In the policy control method for multipath transmission, association information is transmitted in a resource modification process, and a communication peer is user equipment (UE). The UE may perform service packet transmission using at least two transmission subflows, and an example in which the UE performs service packet transmission using two transmission subflows is used herein for detailed description. As shown in FIG. 5A to FIG. 5C, the policy control method for multipath transmission may include the following steps.

501. The UE establishes a PDU connection 1 using a base station 1 and a forwarding plane network element 1.

502. The UE establishes, for the PDU connection 1 using the base station 1 and the forwarding plane network element 1, a transmission subflow 1 on which the UE communicates with a server.

503. The UE establishes a PDU connection 2 using a base station 2 and a forwarding plane network element 2.

504. The UE establishes, for the PDU connection 2 using the base station 2 and the forwarding plane network element 2, a transmission subflow 2 on which the UE communicates with the server.

505. The UE sends a first resource request to a control plane network element using the PDU connection 1, where the first resource request carries a flow identifier of the transmission subflow 1.

506. The control plane network element sends, to the forwarding plane network element 1, the first resource request transmitted by the UE using the PDU connection 1.

507. The forwarding plane network element 1 interacts with a policy decision network element.

508. The forwarding plane network element 1 performs corresponding resource modification on the transmission subflow 1 using the control plane network element, the base station 1, and the UE.

In this embodiment of the present disclosure, the first resource request transmitted on the PDU connection 1 may be a resource establishment request, namely, a request to establish or activate one or some resources on the connection. The request may include the flow identifier of the transmission subflow 1 and information about a resource that the UE requests to establish. The forwarding plane network element 1 may establish an IP-CAN session based on the first resource request, to implement interaction with the policy decision network element. Specifically, the forwarding plane network element 1 sends a session request to the policy decision network element. The session request may carry the flow identifier of the transmission subflow 1. The policy decision network element responds to the session request, and may initiate policy modification using a policy enforcement network element. The policy decision network element delivers a modification policy to the forwarding plane network element 1, so that the forwarding plane network element 1 initiates corresponding resource modification according to the modification policy. In this case, the resource modification is to establish or activate a requested resource.

509. After completing the resource modification, the forwarding plane network element 1 returns confirmation information to the policy decision network element, to indicate that the requested resource modification has been performed.

510. The UE sends a first resource request to the control plane network element using the PDU connection 2, where the first resource request carries a flow identifier of the transmission subflow 2.

511. The control plane network element sends, to the forwarding plane network element 2, the first resource request transmitted by the UE using the PDU connection 2.

512. The forwarding plane network element 2 interacts with the policy decision network element.

513. The forwarding plane network element 2 performs corresponding resource modification on the transmission subflow 2 using the control plane network element, the base station 2, and the UE.

Similarly, the first resource request transmitted on the PDU connection 2 may be a resource establishment request, namely, a request to establish one or some resources on the connection. The request may include the flow identifier of the transmission subflow 2 and information about a resource that the UE requests to establish. The forwarding plane network element 2 may establish an IP-CAN session based on the first resource request, to implement interaction with the policy decision network element. Specifically, the forwarding plane network element 2 sends a session request to the policy decision network element. The session request may carry the flow identifier of the transmission subflow 2. The policy decision network element responds to the session request, and may initiate policy modification using the policy enforcement network element. The policy decision network element delivers a modification policy to the forwarding plane network element 2, so that the forwarding plane network element 2 performs corresponding resource modification according to the modification policy. In this case, the resource modification is to establish or activate a requested resource.

514. After completing the resource modification, the forwarding plane network element 2 returns confirmation information to the policy decision network element, to indicate that the requested resource modification has been performed.

It may be understood that step 505 to step 509 and step 510 to step 514 may be performed sequentially, synchronously, or alternately. This is not limited in this embodiment of the present disclosure. Step 505 to step 514 may be considered as a resource establishment process.

515. The UE detects that resource modification needs to be performed on a transmission subflow.

516. The UE sends a second resource request to the control plane network element on the transmission subflow, where the second resource request carries association information of the transmission subflow 1 and the transmission subflow 2.

In this embodiment of the present disclosure, the second resource request may be a resource modification request. When detecting that resource modification needs to be performed on the transmission subflow 1, the UE may send the second resource request on the transmission subflow 1. When detecting that resource modification needs to be performed on the transmission subflow 2, the UE may send the second resource request on the transmission subflow 2. Herein, an example in which resource modification needs to be performed on the transmission subflow 1 is used for description.

517. The control plane network element forwards the second resource request to the forwarding plane network element 1.

In this embodiment of the present disclosure, the control plane network element may send the second resource request and the association information of the two transmission subflows together to the forwarding plane network element 1, or may send the second resource request to the forwarding plane network element 1, and directly send the association information of the two transmission subflows to the policy decision network element. This is not limited in this embodiment of the present disclosure.

518. The forwarding plane network element 1 sends a policy control modification request to the policy decision network element.

In this embodiment of the present disclosure, when the control plane network element directly sends the association information of the two transmission subflows to the policy decision network element, the policy control modification request may not carry the association information. When the control plane network element sends the second resource request and the association information together, the policy control modification request may carry the association information of the two transmission subflows.

519. The policy decision network element responds to the policy control modification request, and determines a resource modification policy of at least one transmission subflow in the transmission subflow 1 and the transmission subflow 2 based on the association information.

Optionally, a specific implementation of step 519 that the policy decision network element determines a resource modification policy of at least one transmission subflow in the transmission subflow 1 and the transmission subflow 2 based on the association information may be as follows:

The policy decision network element obtains at least one type of information of load statuses, air interface types, and base station types of the transmission subflow 1 and the transmission subflow 2 based on the association information; and determines the resource modification policy of the at least one transmission subflow in the transmission subflow 1 and the transmission subflow 2 based on the at least one type of information of the load statuses, the air interface types, and the base station types of the transmission subflow 1 and the transmission subflow 2.

520. The policy decision network element delivers the resource modification policy for resource modification.

Specifically, a specific implementation of step 520 that the policy decision network element delivers the resource modification policy for resource modification may include the following steps.

(51) The policy decision network element sends the resource modification policy to a forwarding plane network element corresponding to the at least one transmission subflow.

(52) The forwarding plane network element corresponding to the at least one transmission subflow performs corresponding resource modification according to the resource modification policy.

In this embodiment of the present disclosure, the method described in FIG. 5A to FIG. 5C may further include the following step.

(53) After completing the resource modification, the forwarding plane network element corresponding to the at least one transmission subflow returns confirmation information to the policy decision network element, to indicate that the requested resource modification has been performed.

It may be understood that, when detecting that resource modification needs to be performed on the transmission subflow 2 in step 515, the UE may send the second resource request on the transmission subflow 2, and transmit the association information of the two transmission subflows. For a specific implementation process, refer to step 516 to step 520. Details are not described herein again. Step 515 to step 520 may be considered as a resource modification process, and the association information is transmitted in the resource modification process.

In an optional implementation, when the UE can establish a bearer, the first resource request transmitted by the UE using each of the PDU connection 1 and the PDU connection 2 may be a dedicated bearer activation request, and the resource modification may be dedicated bearer activation. In this case, step 505 to step 509 are an activation process of a dedicated bearer on the transmission subflow 1, and step 510 to step 514 are an activation process of a dedicated bearer on the transmission subflow 2. When the UE detects that resource modification needs to be performed on a transmission subflow in step 515, the second resource request transmitted on the transmission subflow may be a dedicated bearer modification request, and carries the association information of the two transmission subflows. Correspondingly, the resource modification policy of the at least one transmission subflow and that is determined by the policy decision network element based on the association information of the two transmission subflows may be a bearer QoS modification policy of the at least one transmission subflow. The bearer QoS modification policy is delivered to a corresponding forwarding plane network element, so that the corresponding forwarding plane network element initiates bearer QoS modification, and returns confirmation information to the policy decision network element, to indicate that the requested bearer QoS modification has been performed.

In this embodiment of the present disclosure, after the method described in FIG. 5A to FIG. 5C is implemented, the UE separately establishes PDU connections using a plurality of different base stations, and establishes corresponding transmission subflows. The UE may notify the policy decision network element of flow identifiers of the transmission subflows in a resource establishment process. When the UE detects that resource modification needs to be performed on one of the transmission subflows, the UE notifies the policy decision network element of association information of the transmission subflows in a resource modification process, so that the policy decision network element determines, based on the association information, one or more transmission subflows for resource modification. Therefore, a signaling processing quantity can be reduced when resource modification is performed in multipath transmission, a processing procedure is further optimized, and system resource consumption is reduced.

Figure 6A:
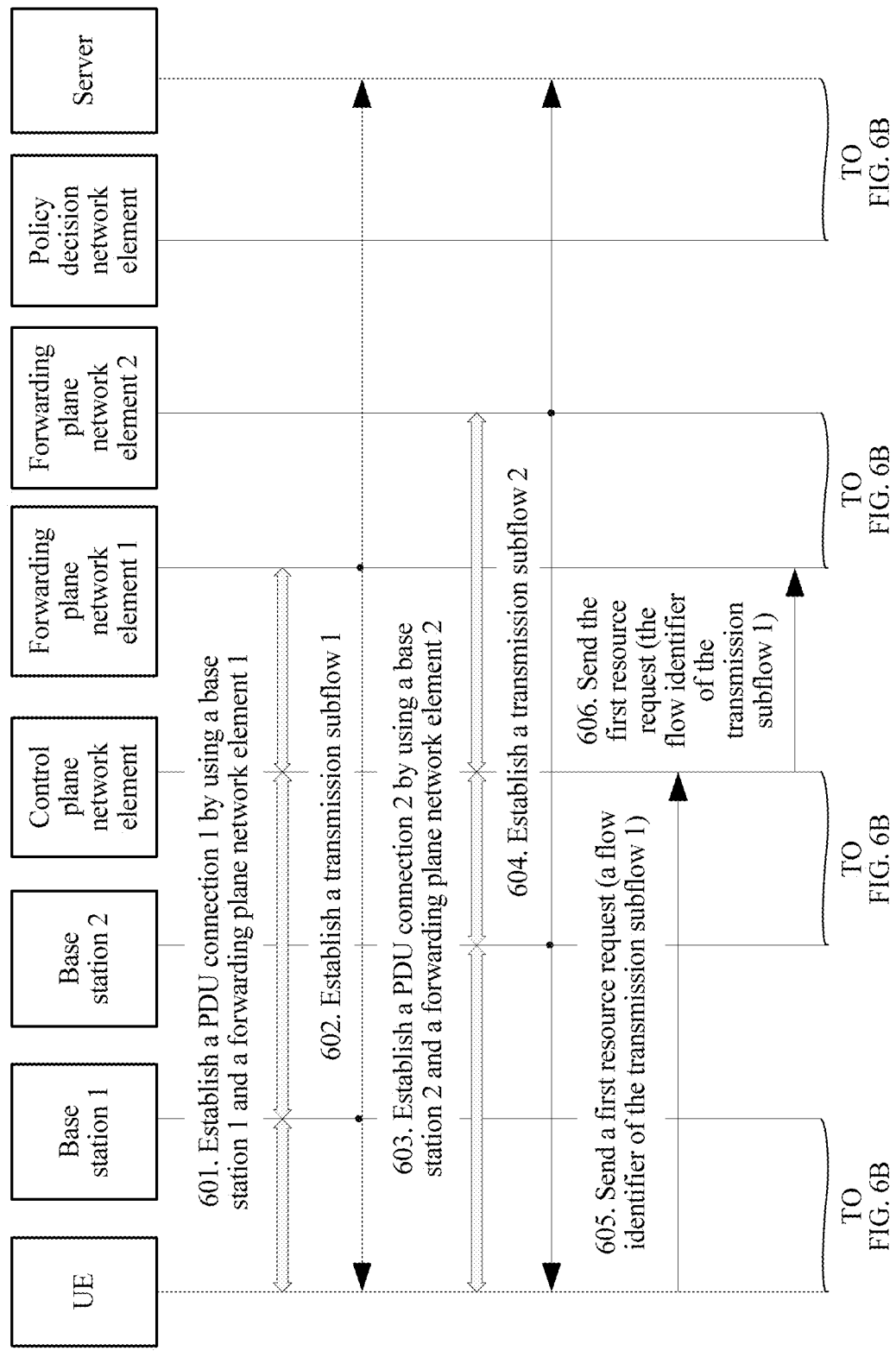
FIG. 6A to FIG. 6C are a schematic flowchart of still another policy control method for multipath transmission according to an embodiment of the present disclosure.
Figure 6B:
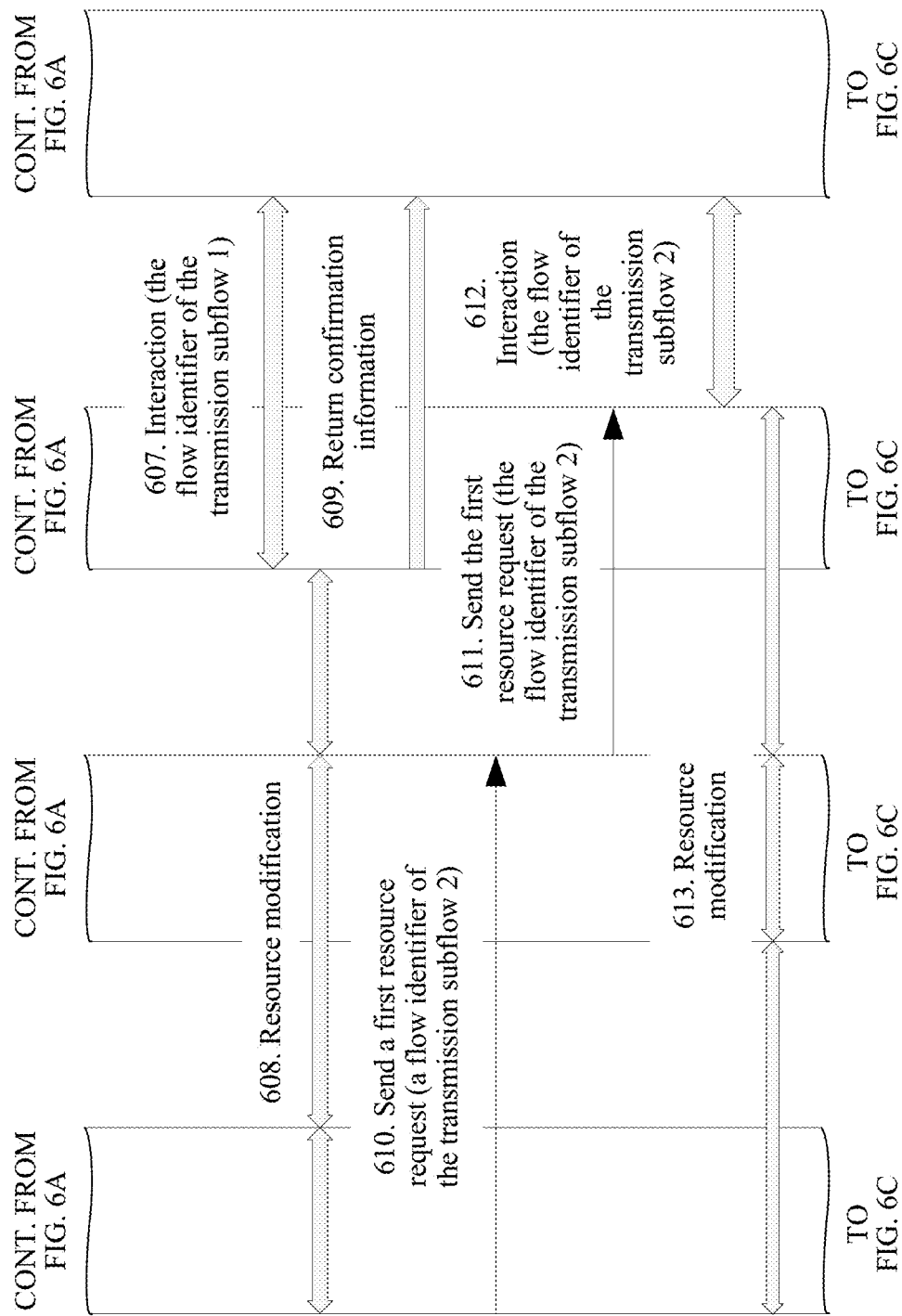
Figure 6C:
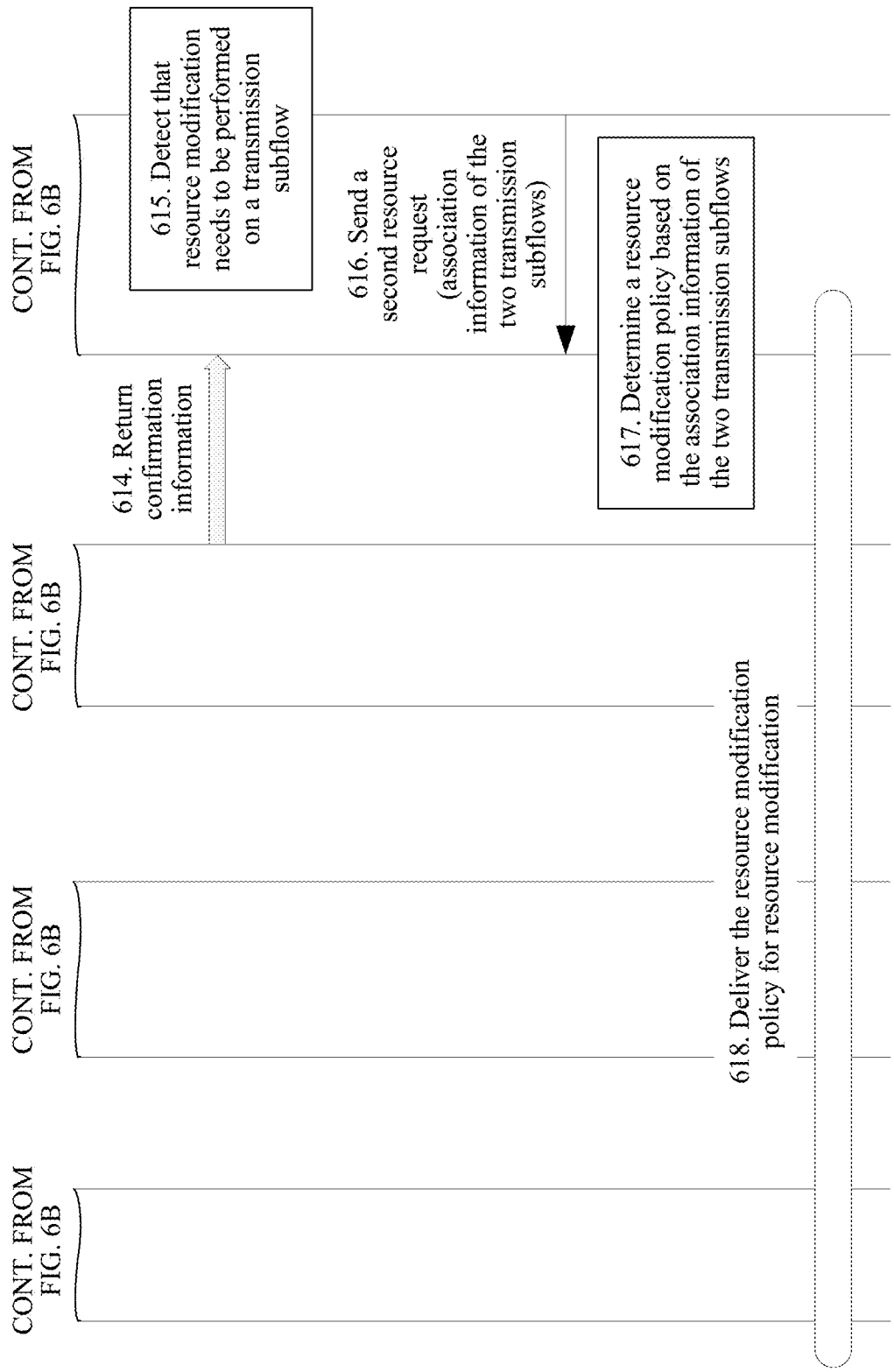

Based on the network architecture of multipath transmission shown in FIG. 2, an embodiment of the present disclosure discloses still another policy control method for multipath transmission. FIG. 6A to FIG. 6C are a schematic flowchart of still another policy control method for multipath transmission according to an embodiment of the present disclosure. In the policy control method for multipath transmission, association information is transmitted in a resource modification process, and a communication peer is a server supporting multipath transmission. User equipment (UE) may perform service packet transmission using at least two transmission subflows, and an example in which the UE performs service packet transmission using two transmission subflows is used herein for detailed description. As shown in FIG. 6A to FIG. 6C, the policy control method for multipath transmission may include the following steps.

601. The UE establishes a PDU connection 1 using a base station 1 and a forwarding plane network element 1.

602. The UE establishes, for the PDU connection 1 using the base station 1 and the forwarding plane network element 1, a transmission subflow 1 on which the UE communicates with the server.

603. The UE establishes a PDU connection 2 using a base station 2 and a forwarding plane network element 2.

604. The UE establishes, for the PDU connection 2 using the base station 2 and the forwarding plane network element 2, a transmission subflow 2 on which the UE communicates with the server.

605. The UE sends a first resource request to a control plane network element using the PDU connection 1, where the first resource request carries a flow identifier of the transmission subflow 1.

606. The control plane network element sends, to the forwarding plane network element 1, the first resource request transmitted by the UE using the PDU connection 1.

607. The forwarding plane network element 1 interacts with a policy decision network element.

608. The forwarding plane network element 1 performs corresponding resource modification on the transmission subflow 1 using the control plane network element, the base station 1, and the UE.

In this embodiment of the present disclosure, the first resource request transmitted on the PDU connection 1 may be a resource establishment request, namely, a request to establish one or some resources on the connection. The request may include the flow identifier of the transmission subflow 1 and information about a resource that the UE requests to establish. The forwarding plane network element 1 may establish an IP-CAN session based on the first resource request, to implement interaction with the policy decision network element. Specifically, the forwarding plane network element 1 sends a session request to the policy decision network element. The session request may carry the flow identifier of the transmission subflow 1. The policy decision network element responds to the session request, and may initiate policy modification using a policy enforcement network element. The policy decision network element delivers a modification policy to the forwarding plane network element 1, so that the forwarding plane network element 1 initiates corresponding resource modification according to the modification policy. In this case, the resource modification is to establish or activate a requested resource.

609. After completing the resource modification, the forwarding plane network element 1 returns confirmation information to the policy decision network element, to indicate that the requested resource modification has been performed.

610. The UE sends a first resource request to the control plane network element using the PDU connection 2, where the first resource request carries a flow identifier of the transmission subflow 2.

611. The control plane network element sends, to the forwarding plane network element 2, the first resource request transmitted by the UE using the PDU connection 2.

612. The forwarding plane network element 2 interacts with the policy decision network element.

613. The forwarding plane network element 2 performs corresponding resource modification on the transmission subflow 2 using the control plane network element, the base station 2, and the UE.

Similarly, the first resource request transmitted on the PDU connection 2 may be a resource establishment request, namely, a request to establish one or some resources on the connection. The request may include the flow identifier of the transmission subflow 2 and information about a resource that the UE requests to establish. The forwarding plane network element 2 may establish an IP-CAN session based on the first resource request, to implement interaction with the policy decision network element. Specifically, the forwarding plane network element 2 sends a session request to the policy decision network element. The session request may carry the flow identifier of the transmission subflow 2. The policy decision network element responds to the session request, and may initiate policy modification using the policy enforcement network element. The policy decision network element delivers a modification policy to the forwarding plane network element 2, so that the forwarding plane network element 2 performs corresponding resource modification according to the modification policy. In this case, the resource modification is to establish or activate a requested resource.

614. After completing the resource modification, the forwarding plane network element 2 returns confirmation information to the policy decision network element, to indicate that the requested resource modification has been performed.

It may be understood that step 605 to step 609 and step 610 to step 614 may be performed sequentially, synchronously, or alternately. This is not limited in this embodiment of the present disclosure. Step 605 to step 614 may be considered as a resource establishment process.

615. The server detects that resource modification needs to be performed on a transmission subflow.

In this embodiment of the present disclosure, the server may determine, based on a service requirement, a transmission subflow on which resource modification needs to be performed, for example, determine which transmission subflow requires higher bandwidth.

616. The server sends a second resource request to the policy decision network element on the transmission subflow, where the second resource request carries association information of the transmission subflow 1 and the transmission subflow 2.

In this embodiment of the present disclosure, the second resource request may be the foregoing resource modification request. The resource modification request carries the association information of the two transmission subflows. When detecting that resource modification needs to be performed on the transmission subflow 1, the server may send, on the transmission subflow 1, the second resource request carrying the association information. When detecting that resource modification needs to be performed on the transmission subflow 2, the server may send, on the transmission subflow 2, the second resource request carrying the association information.

617. The policy decision network element responds to the second resource request, and determines a resource modification policy of at least one transmission subflow in the transmission subflow 1 and the transmission subflow 2 based on the association information.

Optionally, a specific implementation of step 617 that the policy decision network element determines a resource modification policy of at least one transmission subflow in the transmission subflow 1 and the transmission subflow 2 based on the association information may be as follows.

The policy decision network element obtains at least one type of information of load statuses, air interface types, and base station types of the transmission subflow 1 and the transmission subflow 2 based on the association information; and determines the resource modification policy of the at least one transmission subflow in the transmission subflow 1 and the transmission subflow 2 based on the at least one type of information of the load statuses, the air interface types, and the base station types of the transmission subflow 1 and the transmission subflow 2.

618. The policy decision network element delivers the resource modification policy for resource modification.

Specifically, a specific implementation of step 618 that the policy decision network element delivers the resource modification policy for resource modification may include the following steps.

(61) The policy decision network element sends the resource modification policy to a forwarding plane network element corresponding to the at least one transmission subflow.

(62) The forwarding plane network element corresponding to the at least one transmission subflow performs corresponding resource modification according to the resource modification policy.

In this embodiment of the present disclosure, the method described in FIG. 6A to FIG. 6C may further include the following step.

(63) After completing the resource modification, the forwarding plane network element corresponding to the at least one transmission subflow returns confirmation information to the policy decision network element, to indicate that the requested resource modification has been performed.

Step 615 to step 618 may be considered as a resource modification process, and the association information is transmitted in the resource modification process.

In an optional implementation, when the UE can establish a bearer, the first resource request transmitted by the UE using each of the PDU connection 1 and the PDU connection 2 may be a dedicated bearer activation request, and the resource modification may be dedicated bearer activation. In this case, step 605 to step 609 are an activation process of a dedicated bearer on the transmission subflow 1, and step 610 to step 614 are an activation process of a dedicated bearer on the transmission subflow 2. When the server detects that resource modification needs to be performed on a transmission subflow in step 615, the second resource request transmitted on the transmission subflow may be a dedicated bearer modification request, and carries the association information of the two transmission subflows. Correspondingly, the resource modification policy of the at least one transmission subflow and that is determined by the policy decision network element based on the association information of the two transmission subflows may be a bearer QoS modification policy of the at least one transmission subflow. The bearer QoS modification policy is delivered to a corresponding forwarding plane network element, so that the corresponding forwarding plane network element initiates bearer QoS modification, and returns confirmation information to the policy decision network element, to indicate that the requested bearer QoS modification has been performed.

In this embodiment of the present disclosure, after the method described in FIG. 6A to FIG. 6C is implemented, the UE separately establishes PDU connections using a plurality of different base stations, and establishes corresponding transmission subflows. The UE may notify the policy decision network element of flow identifiers of the transmission subflows in a resource establishment process. When the server detects that resource modification needs to be performed on one of the transmission subflows, the server notifies the policy decision network element of association information of the two transmission subflows in a resource modification process, so that the policy decision network element determines, based on the association information, one or more transmission subflows for resource modification. Therefore, a signaling processing quantity can be reduced when resource modification is performed in multipath transmission, a processing procedure is further optimized, and system resource consumption is reduced.

Figure 7:
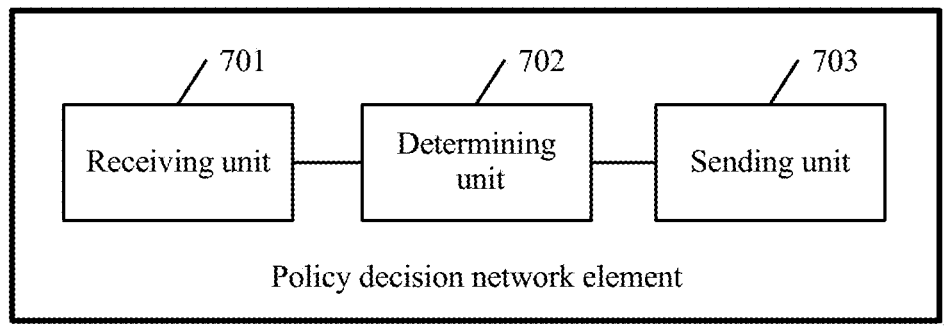
FIG. 7 is a schematic structural diagram of a policy decision network element according to an embodiment of the present disclosure.

Based on the network architecture of multipath transmission shown in FIG. 2, an embodiment of the present disclosure discloses a policy decision network element. FIG. 7 is a schematic structural diagram of a policy decision network element according to an embodiment of the present disclosure. The policy decision network element may be configured to execute the policy control method for multipath transmission disclosed in the embodiments of the present disclosure. As shown in FIG. 7, the policy decision network element may include a receiving unit 701, a determining unit 702, and a sending unit 703.

The receiving unit 701 is configured to receive association information of at least two transmission subflows from a communication peer.

In this embodiment of the present disclosure, user equipment (UE) supporting multipath transmission may perform service packet transmission using the at least two transmission subflows, that is, the UE may transmit a same service packet on the at least two transmission subflows. When the UE transmits the same service packet on the at least two transmission subflows, the receiving unit 701 may receive the association information of the at least two transmission subflows from the communication peer. The association information is used to indicate that the same service packet is transmitted on the at least two transmission subflows. The association information may include flow identifiers of the at least two transmission subflows. Different transmission subflows have different flow identifiers. The flow identifiers may be used to distinguish between the different transmission subflows.

In this embodiment of the present disclosure, the communication peer may be the UE, or may be a server supporting multipath transmission, for example, an application server.

In an optional implementation, a specific implementation in which the receiving unit 701 receives the association information of the at least two transmission subflows from the communication peer may be as follows.

The receiving unit 701 receives, in a resource establishment process, the association information of the at least two transmission subflows from the communication peer; or the receiving unit 701 receives, in a resource modification process, the association information of the at least two transmission subflows from the communication peer.

In this implementation, after the at least two transmission subflows are established, the communication peer may initiate a resource establishment request, to request to establish or activate one or some resources corresponding to each transmission subflow. In addition, when detecting that resource modification needs to be performed on a transmission subflow, the communication peer may initiate a resource modification request on the transmission subflow.

In this implementation, when the association information is received in the resource establishment process, the communication peer may add the association information of the at least two transmission subflows to a resource establishment request initiated on one of the transmission subflows. When the association information is received in the resource modification process, the communication peer may add the association information of the at least two transmission subflows to an initiated resource modification request.

The determining unit 702 is configured to determine a resource modification policy of at least one transmission subflow in the at least two transmission subflows based on the association information.

In this embodiment of the present disclosure, the determining unit 702 may determine the resource modification policy of the at least one transmission subflow in the at least two transmission subflows based on the association information received by the receiving unit 701. The at least one transmission subflow may be any one or more of the at least two transmission subflows, or may be a transmission subflow on which resource modification needs to be performed and that is determined with reference to information such as a load status, an air interface type, and a base station type of each transmission subflow.

In this embodiment of the present disclosure, the resource modification policy may include but is not limited to information such as a flow identifier of each transmission subflow in the at least one transmission subflow, and a type of a resource that needs to be modified and a modification amount on each transmission subflow. The type of the resource that needs to be modified means which type of resource is to be modified, and may be a quality of service (QoS) parameter. Further, the QoS parameter may include a QCI, used to measure information such as a packet loss rate, a delay, bandwidth, and a priority during service transmission. The modification amount means an amount by which a resource is modified.

The sending unit 703 is configured to send the resource modification policy to a forwarding plane network element corresponding to the at least one transmission subflow.

In this embodiment of the present disclosure, after the determining unit 702 determines the resource modification policy of the at least one transmission subflow, the sending unit 703 may send the resource modification policy to the forwarding plane network element corresponding to the at least one transmission subflow. One transmission subflow is corresponding to one forwarding plane network element, and forwarding plane network elements corresponding to different transmission subflows may be different. After receiving a resource modification policy, a forwarding plane network element may parse the resource modification policy to obtain a modification policy of a transmission subflow corresponding to the forwarding plane network element, and perform resource modification according to the modification policy.

In an optional implementation, the receiving unit 701 may be further configured to receive, in the resource modification process, a policy control modification request from a forwarding plane network element, where the forwarding plane network element is a forwarding plane network element corresponding to one of the at least two transmission subflows.

Correspondingly, the determining unit 702 may be specifically configured to: respond to the policy control modification request, and determine the resource modification policy of the at least one transmission subflow in the at least two transmission subflows based on the association information.

The receiving unit 701 may receive, in the resource modification process, the policy control modification request from the forwarding plane network element. The policy control modification request may be used to instruct the determining unit 702 to determine the resource modification policy of the at least one transmission subflow in the at least two transmission subflows. The forwarding plane network element is the forwarding plane network element corresponding to one of the at least two transmission subflows. Specifically, the forwarding plane network element may be a forwarding plane network element corresponding to a transmission subflow on which a resource modification request is initiated.

In an optional implementation, the receiving unit 701 may be further configured to receive, in the resource modification process, a resource modification request from the communication peer.

Correspondingly, the determining unit 702 may be specifically configured to: respond to the resource modification request, and determine the resource modification policy of the at least one transmission subflow in the at least two transmission subflows based on the association information.

The receiving unit 701 may receive, in the resource modification process, the resource modification request from the communication peer. The resource modification request may be used to instruct the determining unit 702 to determine the resource modification policy of the at least one transmission subflow in the at least two transmission subflows.

Figure 8:
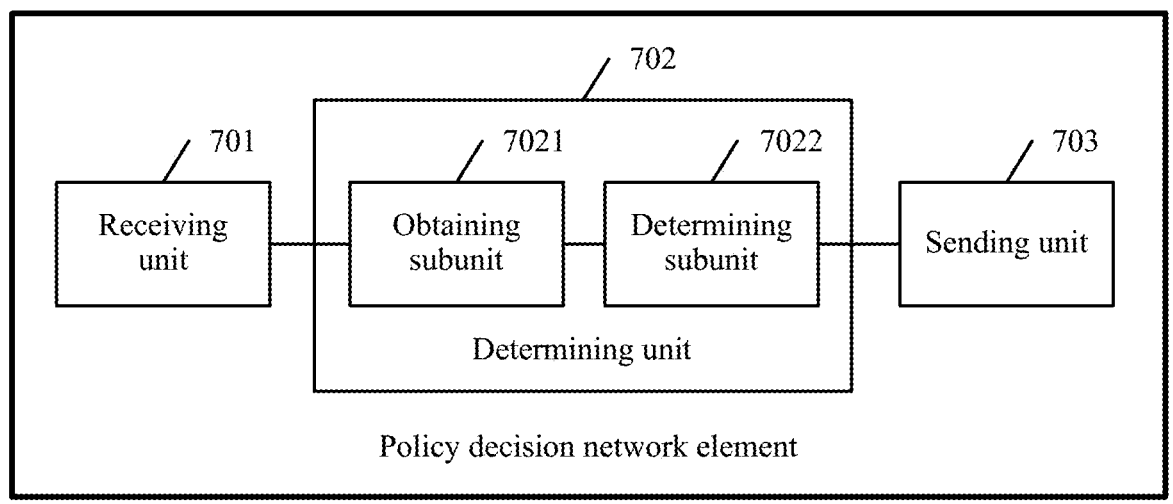
FIG. 8 is a schematic structural diagram of another policy decision network element according to an embodiment of the present disclosure.

FIG. 8 is a schematic structural diagram of another policy decision network element according to an embodiment of the present disclosure. The policy decision network element may be configured to execute the policy control method for multipath transmission disclosed in the embodiments of the present disclosure. The policy decision network element shown in FIG. 8 is obtained by further optimizing the policy decision network element shown in FIG. 7. Compared with that in the policy decision network element shown in FIG. 7, the determining unit 702 in the policy decision network element shown in FIG. 8 may include: an obtaining subunit 7021, configured to obtain at least one type of information of load statuses, air interface types, and base station types of the at least two transmission subflows based on the association information; and a determining subunit 7022, configured to determine the resource modification policy of the at least one transmission subflow in the at least two transmission subflows based on the at least one type of information of the load statuses, the air interface types, and the base station types of the at least two transmission subflows.

The information such as the load statuses, the air interface types, and the base station types of the at least two transmission subflows may be reported by a network management system or a radio access network to the policy decision network element in real time or at a specific interval, or may be proactively obtained by the policy decision network element from a network management system or a RAN side.

In this embodiment of the present disclosure, the policy decision network element shown in FIG. 7 and FIG. 8 may determine, based on the association information of the at least two transmission subflows on which the same service packet is transmitted, one or more transmission subflows on which resource modification needs to be performed, so that resource modification is performed on the one or more transmission subflows, instead of performing resource modification on each transmission subflow. Therefore, a signaling processing quantity can be reduced when resource modification is performed in multipath transmission, a processing procedure is further optimized, and system resource consumption is reduced.

Figure 9:
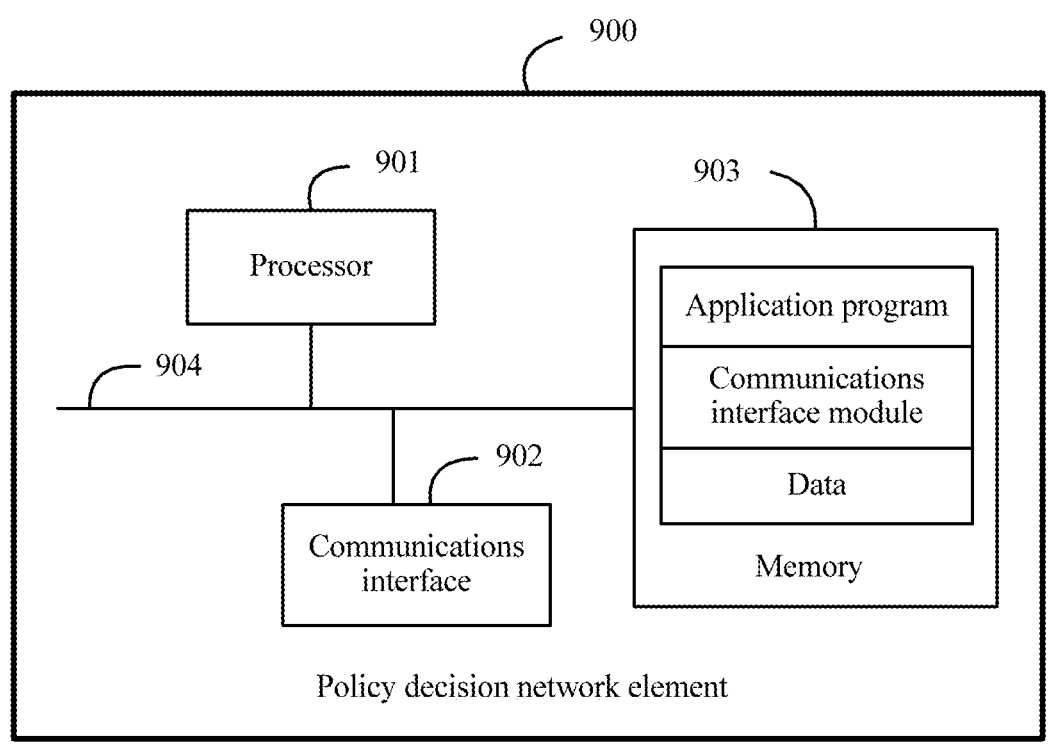
FIG. 9 is a schematic structural diagram of still another policy decision network element according to an embodiment of the present disclosure.

Based on the network architecture of multipath transmission shown in FIG. 2, an embodiment of the present disclosure discloses still another policy decision network element. FIG. 9 is a schematic structural diagram of still another policy decision network element according to an embodiment of the present disclosure. The policy decision network element may be configured to execute the policy control method for multipath transmission disclosed in the embodiments of the present disclosure. As shown in FIG. 9, the policy decision network element 900 may include components such as at least one processor 901, for example, a central processing unit (CPU), at least one communications interface 902, and a memory 903. These components may perform communication and connection using one or more communications buses 904. A person skilled in the art may understand that a structure of the policy decision network element 900 shown in FIG. 9 imposes no limitation on this embodiment of the present disclosure. The structure may be a bus structure, or may be a star structure, and may alternatively include components more or fewer than those shown in the figure, or combine some components, or have components disposed differently.

In this embodiment of the present disclosure, the communications interface 902 may include a wired interface, a wireless interface, and the like, and may be configured to communicate with a communication peer.

In this embodiment of the present disclosure, the memory 903 may be a high-speed RAM or a non-volatile memory, such as at least one magnetic disk storage. Optionally, the memory 903 may be at least one storage apparatus that is far away from the processor 901. As shown in FIG. 9, the memory 903 may include an application program, a communications interface module, data, and the like. This is not limited in this embodiment of the present disclosure.

In the policy decision network element 900 shown in FIG. 9, the processor 901 may be configured to invoke the application program stored in the memory 903, to perform the following operations: triggering the communications interface 902 to receive association information of at least two transmission subflows from the communication peer, where the association information includes flow identifiers of the at least two transmission subflows, and user equipment (UE) performs service packet transmission using the at least two transmission subflows; determining a resource modification policy of at least one transmission subflow in the at least two transmission subflows based on the association information; and triggering the communications interface 902 to send the resource modification policy to a forwarding plane network element corresponding to the at least one transmission subflow, so that the forwarding plane network element corresponding to the at least one transmission subflow performs resource modification according to the resource modification policy.

In an optional implementation, the communication peer may include the UE or a server supporting multipath transmission.

In an optional implementation, a specific implementation in which the processor 901 triggers the communications interface 902 to receive the association information of the at least two transmission subflows from the communication peer may be: triggering the communications interface 902 to receive, in a resource establishment process, the association information of the at least two transmission subflows from the communication peer; or triggering the communications interface 902 to receive, in a resource modification process, the association information of the at least two transmission subflows from the communication peer.

In an optional implementation, the processor 901 may be further configured to invoke the application program stored in the memory 903, to perform the following operation: triggering the communications interface 902 to receive, in the resource modification process, a policy control modification request from a forwarding plane network element, where the forwarding plane network element is a forwarding plane network element corresponding to one of the at least two transmission subflows.

A specific implementation in which the processor 901 determines the resource modification policy of the at least one transmission subflow in the at least two transmission subflows based on the association information may be: responding to the policy control modification request, and determining the resource modification policy of the at least one transmission subflow in the at least two transmission subflows based on the association information.

In an optional implementation, the processor 901 may be further configured to invoke the application program stored in the memory 903, to perform the following operation: triggering the communications interface 902 to receive, in the resource modification process, a resource modification request from the communication peer.

A specific implementation in which the processor 901 determines the resource modification policy of the at least one transmission subflow in the at least two transmission subflows based on the association information may be: responding to the resource modification request, and determining the resource modification policy of the at least one transmission subflow in the at least two transmission subflows based on the association information.

In an optional implementation, the specific implementation in which the processor 901 determines the resource modification policy of the at least one transmission subflow in the at least two transmission subflows based on the association information may be: obtaining at least one type of information of load statuses, air interface types, and base station types of the at least two transmission subflows based on the association information; and determining the resource modification policy of the at least one transmission subflow in the at least two transmission subflows based on the at least one type of information of the load statuses, the air interface types, and the base station types of the at least two transmission subflows.

Specifically, the policy decision network element described in this embodiment of the present disclosure may implement some or all procedures in the embodiments of the policy control method for multipath transmission described with reference to FIG. 3, FIG. 4A to FIG. 4C, FIG. 5A to FIG. 5C, or FIG. 6A to FIG. 6C in the present disclosure.

In this embodiment of the present disclosure, the policy decision network element shown in FIG. 9 may determine, based on the association information of the at least two transmission subflows on which a same service packet is transmitted, one or more transmission subflows on which resource modification needs to be performed, so that resource modification is performed on the one or more transmission subflows, instead of performing resource modification on each transmission subflow. Therefore, a signaling processing quantity can be reduced when resource modification is performed in multipath transmission, a processing procedure is further optimized, and system resource consumption is reduced.

Figure 10:
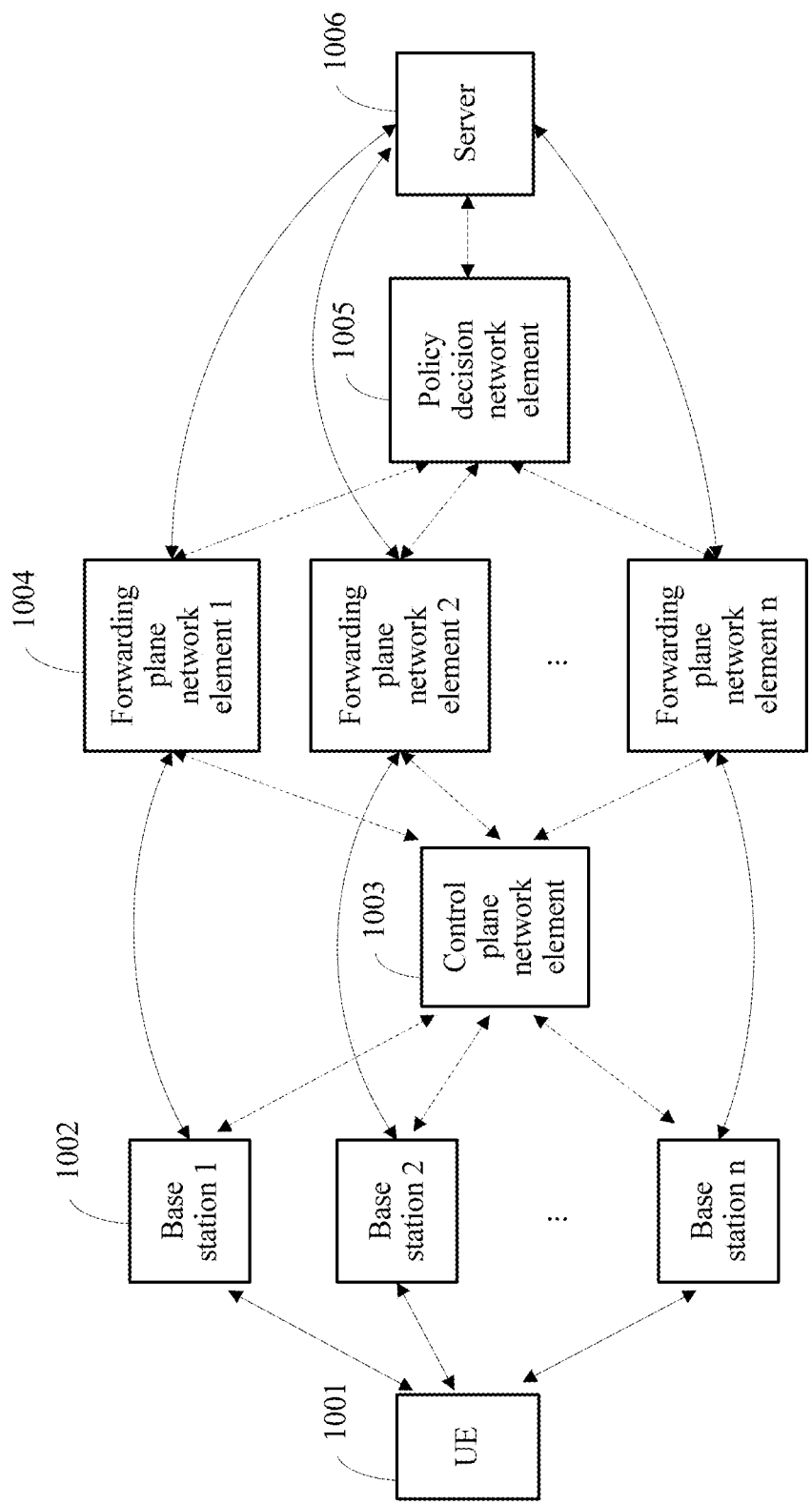
FIG. 10 is a schematic structural diagram of a policy control system for multipath transmission according to an embodiment of the present disclosure.

FIG. 10 is a policy control system for multipath transmission according to an embodiment of the present disclosure. As shown in FIG. 10, the policy control system for multipath transmission may include user equipment (UE) 1001, at least two base stations 1002 (such as a base station 1, a base station 2, . . . , and a base station n, where n is a positive integer greater than or equal to 2), a control plane network element 1003, at least two forwarding plane network elements 1004 (such as a forwarding plane network element 1, a forwarding plane network element 2, . . . , and a forwarding plane network element n), a policy decision network element 1005, and a server 1006. For specific functions of the UE 1001, the base station 1002, the control plane network element 1003, the forwarding plane network element 1004, the policy decision network element 1005, and the server 1006, refer to the content described in the foregoing embodiments. Details are not described herein again. The policy control system for multipath transmission shown in FIG. 10 may be configured to execute the policy control method for multipath transmission described in any one of FIG. 3 to FIG. 6C.

In this embodiment of the present disclosure, the policy control system for multipath transmission shown in FIG. 10 may determine, based on association information of at least two transmission subflows on which a same service packet is transmitted, one or more transmission subflows on which resource modification needs to be performed, so that resource modification is performed on the one or more transmission subflows, instead of performing resource modification on each transmission subflow. Therefore, a signaling processing quantity can be reduced when resource modification is performed in multipath transmission, a processing procedure is further optimized, and system resource consumption is reduced.

It should be noted that, for brief description, the foregoing method embodiments are represented as a series of actions. However, a person skilled in the art should appreciate that the present disclosure is not limited to the described sequence of the actions, because according to the present disclosure, some steps may be performed in other sequences or simultaneously. In addition, a person skilled in the art should also know that all the embodiments described in this specification are embodiments, and the related actions and modules are not necessarily mandatory to the present disclosure.

In the foregoing embodiments, the description of each embodiment has respective focuses. For a part that is not described in detail in an embodiment, refer to related descriptions in other embodiments.

A sequence of the steps of the method in the embodiments of the present disclosure may be adjusted, and steps may be combined or removed depending on an actual requirement.

The units or subunits in the policy decision network element in the embodiments of the present disclosure may be combined, divided, and removed depending on an actual requirement.

A person of ordinary skill in the art may understand that, all or some of the steps in each method of the foregoing embodiments may be implemented by a program instructing related hardware. The program may be stored in a computer readable storage medium. The storage medium includes a read-only memory (ROM), a random access memory (RAM), a programmable read-only memory (PROM), an erasable programmable read-only memory (EPROM), a one-time programmable read-only memory (OTPROM), an electrically erasable programmable read-only memory (EEPROM), a compact disc read-only memory (CD-ROM) or another optical disc memory, a magnetic disk memory, a magnetic tape memory, or any other computer readable medium that can be used to carry or store data.

The foregoing describes in detail the policy control method for multipath transmission, and the related device provided in the embodiments of the present disclosure. The principles and implementations of the present disclosure are described in this specification using specific examples. The descriptions of the embodiments are merely for ease of understanding the method and core ideas of the present disclosure. In addition, a person of ordinary skill in the art can make modifications to the present disclosure in terms of the specific implementations and application scopes based on the ideas of the present disclosure. In conclusion, the content of this specification shall not be construed as a limitation on the present disclosure.

What is claimed is:

1. A method, comprising:
   receiving, by a policy decision network element from a user equipment (UE), a resource establishment request, the resource establishment request including association information of a plurality of transmission subflows between the UE and a communication peer, the resource establishment request being separate from the plurality of transmission subflows, wherein the UE is an initiator of the resource establishment request;
   determining, by the policy decision network element from the plurality of transmission subflows, a first transmission subflow that needs resource modification based on load statuses of the plurality of transmission subflows;
   determining, by the policy decision network element, a resource modification policy of the first transmission subflow of the plurality of transmission subflows based on the association information in the resource establishment request, the load statuses of the plurality of transmission subflows, QoS requirement information of the plurality of transmission subflows, and threshold values of the plurality of transmission subflows, the QoS requirement information including a packet loss rate, a delay, and a priority during service transmission; and
   sending, by the policy decision network element, the resource modification policy to a first forwarding plane network element corresponding to the first transmission subflow.

2. The method according to claim 1, wherein the receiving the association information comprises:
   receiving, by the policy decision network element in a resource establishment process, the association information of the plurality of transmission subflows from the UE.

3. The method according to claim 2, further comprising:
   receiving, by the policy decision network element in a resource modification process, a policy control modification request from a second forwarding plane network element, wherein the second forwarding plane network element corresponds to one of the plurality of transmission subflows; and
   wherein the determining the resource modification policy of the first transmission subflow comprises:
      in response to receiving the policy control modification request, determining, by the policy decision network element, the resource modification policy of the first transmission subflow of the plurality of transmission subflows based on the association information.

4. The method according to claim 2, further comprising:
   receiving, by the policy decision network element in a resource modification process, a resource request from the UE; and
   wherein the determining the resource modification policy comprises:
      in response to receiving the resource request, determining, by the policy decision network element, the resource modification policy of the first transmission subflow of the plurality of transmission subflows based on the association information.

5. The method according to claim 1, wherein the receiving the association information comprises:
   receiving, by the policy decision network element in a resource modification process, the association information of the plurality of transmission subflows from the UE.

6. The method according to claim 5, further comprising:
   receiving, by the policy decision network element in the resource modification process, a policy control modification request from a second forwarding plane network element, wherein the second forwarding plane network element corresponds to one of the plurality of transmission subflows; and
   wherein determining the resource modification policy comprises:
      in response to receiving the policy control modification request, determining, by the policy decision network element, the resource modification policy of the first transmission subflow of the plurality of transmission subflows based on the association information.

7. The method according to claim 5, further comprising:
   receiving, by the policy decision network element in the resource modification process, a resource modification request from the UE; and
   wherein the determining the resource modification policy comprises:
      in response to receiving the resource modification request, determining, by the policy decision network element, the resource modification policy of the first transmission subflow of the plurality of transmission subflows based on the association information.

8. The method according to claim 1, wherein the determining the resource modification policy comprises:
   obtaining, by the policy decision network element based on the association information, first information of the plurality of transmission subflows, wherein the first information comprises load statuses, air interface types, or base station types of the plurality of transmission subflows; and
   determining, by the policy decision network element, the resource modification policy of the first transmission subflow of the plurality of transmission subflows based on the first information of the plurality of transmission subflows.

9. The method of claim 1, wherein the first transmission subflow corresponds to a first packet data unit (PDU) connection established by the UE using a first base station and the first forwarding plane network element, and wherein the plurality of transmission subflows further include a second PDU connection established by the UE using a second base station and a second forwarding plane network element.

10. The method according to claim 1, wherein the plurality of transmission subflows includes the first transmission subflow and a second transmission subflow, wherein the resource establishment request includes a flow identifier of the second transmission subflow, and wherein the determining the first transmission subflow comprises:
    determining, by the policy decision network element from the first transmission subflow and the second transmission subflow, the first transmission subflow that needs the resource modification based on the load statuses of the first transmission subflow and the second transmission subflow.

11. A network element, comprising:
at least one processor;
a non-transitory memory;
a communications interface; and
a communications bus;
wherein the non-transitory memory is configured to store a program and data;
wherein the communications bus is configured to establish connections and communication between the at least one processor, the non-transitory memory, and the communications interface; and
wherein the at least one processor is configured to invoke the program stored in the non-transitory memory to:
trigger the communications interface to receive, from a user equipment (UE), a resource establishment request, the resource establishment request including association information of a plurality of transmission subflows between the UE and a communication peer, the resource establishment request being separate from the plurality of transmission subflows, wherein the UE is an initiator of the resource establishment request;
determine, from the plurality of transmission subflows, a first transmission subflow that needs resource modification based on load statuses of the plurality of transmission subflows;
determine a resource modification policy of the first transmission subflow of the plurality of transmission subflows based on the association information in the resource establishment request, the load statuses of the plurality of transmission subflows, QoS requirement information of the plurality of transmission subflows, and threshold values of the plurality of transmission subflows, the QoS requirement information including a packet loss rate, a delay, and a priority during service transmission; and
trigger the communications interface to send the resource modification policy to a first forwarding plane network element corresponding to the first transmission subflow.

12. The network element according to claim 11, wherein the at least one processor being configured to invoke the program stored in the non-transitory memory to trigger the communications interface to receive the association information comprises the at least one processor being configured to invoke the program stored in the non-transitory memory to:
trigger the communications interface to receive, in a resource establishment process, the association information of the plurality of transmission subflows from the UE.

13. The network element according to claim 12, wherein the at least one processor is further configured to invoke the program stored in the non-transitory memory to:
trigger the communications interface to receive, in a resource modification process, a policy control modification request from a second forwarding plane network element, wherein the second forwarding plane network element corresponds to one of the plurality of transmission subflows; and
wherein the at least one processor being configured to invoke the program stored in the non-transitory memory to determine the resource modification policy comprises the at least one processor being configured to invoke the program stored in the non-transitory memory to:
in response receiving to the policy control modification request, determine the resource modification policy of the first transmission subflow of the plurality of transmission subflows based on the association information.

14. The network element according to claim 12, wherein the at least one processor is further configured to invoke the program stored in the non-transitory memory to:
trigger the communications interface to receive, in a resource modification process, a resource request from the UE; and
wherein the at least one processor being configured to invoke the program stored in the non-transitory memory to determine the resource modification policy comprises the at least one processor being configured to invoke the program stored in the non-transitory memory to:
in response to receiving the resource request, determine the resource modification policy of the first transmission subflow in the plurality of transmission subflows based on the association information.

15. The network element according to claim 11, wherein the at least one processor being configured to invoke the program stored in the non-transitory memory to trigger the communications interface to receive the association information comprises the at least one processor being configured to invoke the program stored in the non-transitory memory to:
trigger the communications interface to receive, in a resource modification process, the association information of the plurality of transmission subflows from the UE.

16. The network element according to claim 15, wherein the at least one processor is further configured to invoke the program stored in the non-transitory memory to:
trigger the communications interface to receive, in the resource modification process, a policy control modification request from a second forwarding plane network element, wherein the second forwarding plane network element corresponds to one of the plurality of transmission subflows; and
wherein the at least one processor being configured to invoke the program stored in the non-transitory memory to determine the resource modification policy comprises the at least one processor being configured to invoke the program stored in the non-transitory memory to:
in response to receiving the policy control modification request, determine the resource modification policy of the first transmission subflow of the plurality of transmission subflows based on the association information.

17. The network element according to claim 15, wherein the at least one processor is further configured to invoke the program stored in the non-transitory memory to:
trigger the communications interface to receive, in the resource modification process, a resource modification request from the UE; and
wherein the at least one processor being configured to invoke the program stored in the non-transitory memory to determine the resource modification policy comprises the at least one processor being configured to invoke the program stored in the non-transitory memory to:
in response to receiving the resource modification request, determine the resource modification policy of the first transmission subflow of the plurality of transmission subflows based on the association information.

18. The network element according to claim 11, wherein the at least one processor being configured to invoke the program stored in the non-transitory memory to determine the resource modification policy comprises the at least one processor being configured to invoke the program stored in the non-transitory memory to:
   obtain first information based on the association information, wherein the first information comprises load statuses, air interface types, or base station types of the plurality of transmission subflows; and
   determine the resource modification policy of the first transmission subflow of the plurality of transmission subflows based on the first information.

19. A system, comprising:
   a policy decision network element; and
   a first forwarding plane network element,
   wherein the policy decision network element is configured to:
      receive, from a user equipment (UE), a resource establishment request, the resource establishment request including association information of a plurality of transmission subflows between the UE and a communication peer, the resource establishment request being separate from the plurality of transmission subflows, wherein the UE is an initiator of the resource establishment request;
      determine, from the plurality of transmission subflows, a first transmission subflow that needs resource modification based on load statuses of the plurality of transmission subflows;
      determine a resource modification policy of the first transmission subflow of the plurality of transmission subflows based on the association information in the resource establishment request, the load statuses of the plurality of transmission subflows, QoS requirement information of the plurality of transmission subflows, and threshold values of the plurality of transmission subflows, the QoS requirement information including a packet loss rate, a delay, and a priority during service transmission; and
      send the resource modification policy to the first forwarding plane network element corresponding to the first transmission subflow;
   wherein the first forwarding plane network element is configured to:
      receive the resource modification policy from the policy decision network element; and
      perform resource modification on the first transmission subflow based on the resource modification policy.

* * * * *